United States Patent
Discenzo

(10) Patent No.: US 6,950,193 B1
(45) Date of Patent: *Sep. 27, 2005

(54) SYSTEM FOR MONITORING SUBSTRATE CONDITIONS

(75) Inventor: Frederick M. Discenzo, Brecksville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 290 days.

This patent is subject to a terminal disclaimer.

(21) Appl. No.: 10/254,357

(22) Filed: Sep. 25, 2002

Related U.S. Application Data

(63) Continuation-in-part of application No. 09/625,094, filed on Jul. 25, 2000, which is a continuation-in-part of application No. 09/504,440, filed on Feb. 16, 2000, now Pat. No. 6,359,690, which is a continuation of application No. 09/253,785, filed on Feb. 22, 1999, now Pat. No. 6,067,159, which is a continuation of application No. 08/959,610, filed on Oct. 28, 1997, now Pat. No. 6,111,643.

(51) Int. Cl.⁷ .............................................. G01B 9/02
(52) U.S. Cl. ..................... 356/503; 356/496; 356/482
(58) Field of Search .............................. 356/450, 35.5, 356/477, 498, 496, 482, 503

(56) References Cited

U.S. PATENT DOCUMENTS

| 5,419,636 A | * | 5/1995 | Weiss .......................... 374/161 |
| 6,191,864 B1 | | 2/2001 | Sandhu |

FOREIGN PATENT DOCUMENTS

| EP | 0 232 209 A1 | 8/1987 |
| EP | 0 881 040 A2 | 12/1998 |
| EP | 0 920 092 A2 | 6/1999 |

OTHER PUBLICATIONS

International Search Report, EP 03 01 9152, Nov. 17, 2003.

* cited by examiner

*Primary Examiner*—Andrew H. Lee
(74) *Attorney, Agent, or Firm*—Amin & Turocy, LLP; R. Scott Speroff

(57) ABSTRACT

A system for determining at least one condition of a substrate includes an optical waveguide for transmitting light from a light source. The optical waveguide can be embedded in the substrate and operatively coupled to an interferometric system. The interferometric system is operatively coupled to a processor. The interferometric system provides the processor with information relating to transmissions through the wave guide, which are indicative of substrate conditions and/or operations being performed relative to the substrate.

28 Claims, 29 Drawing Sheets

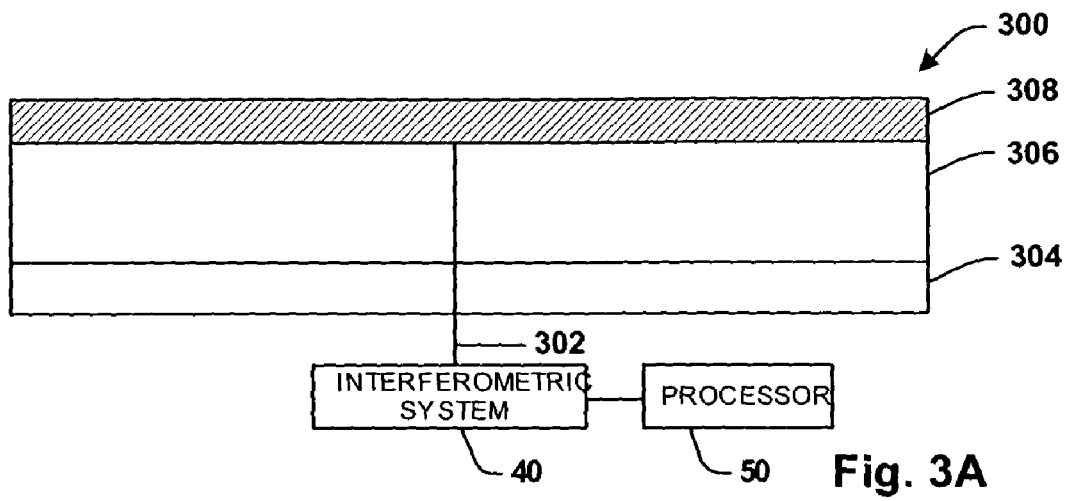
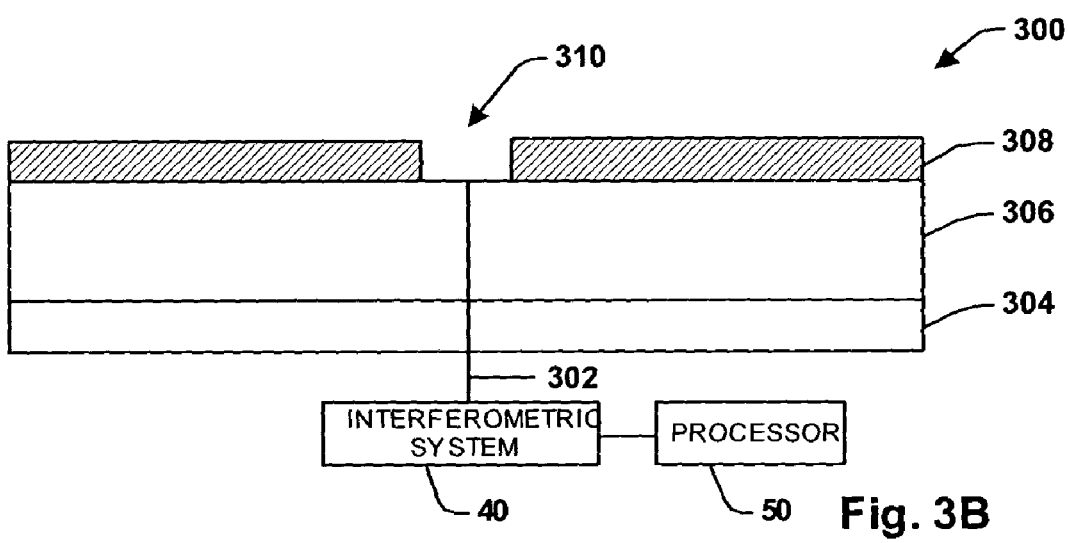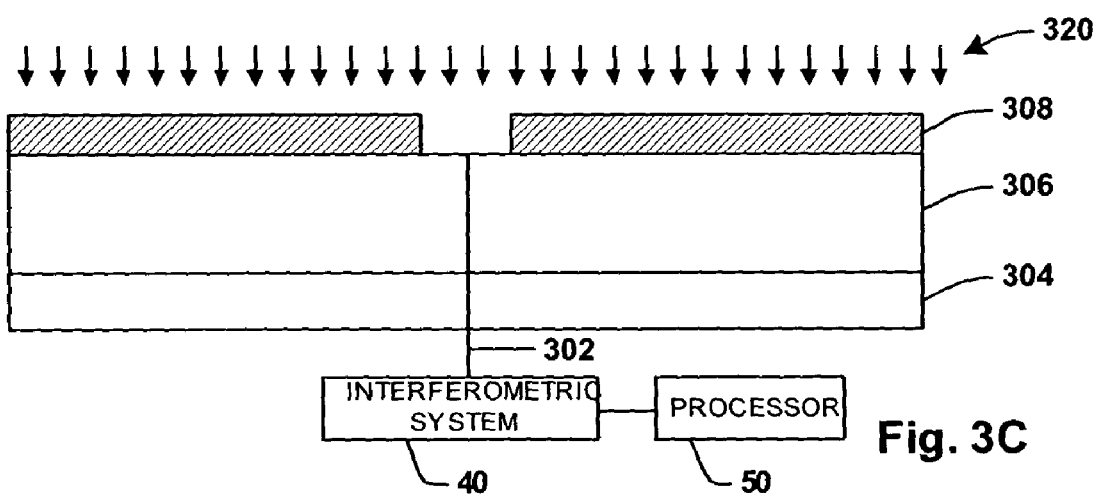

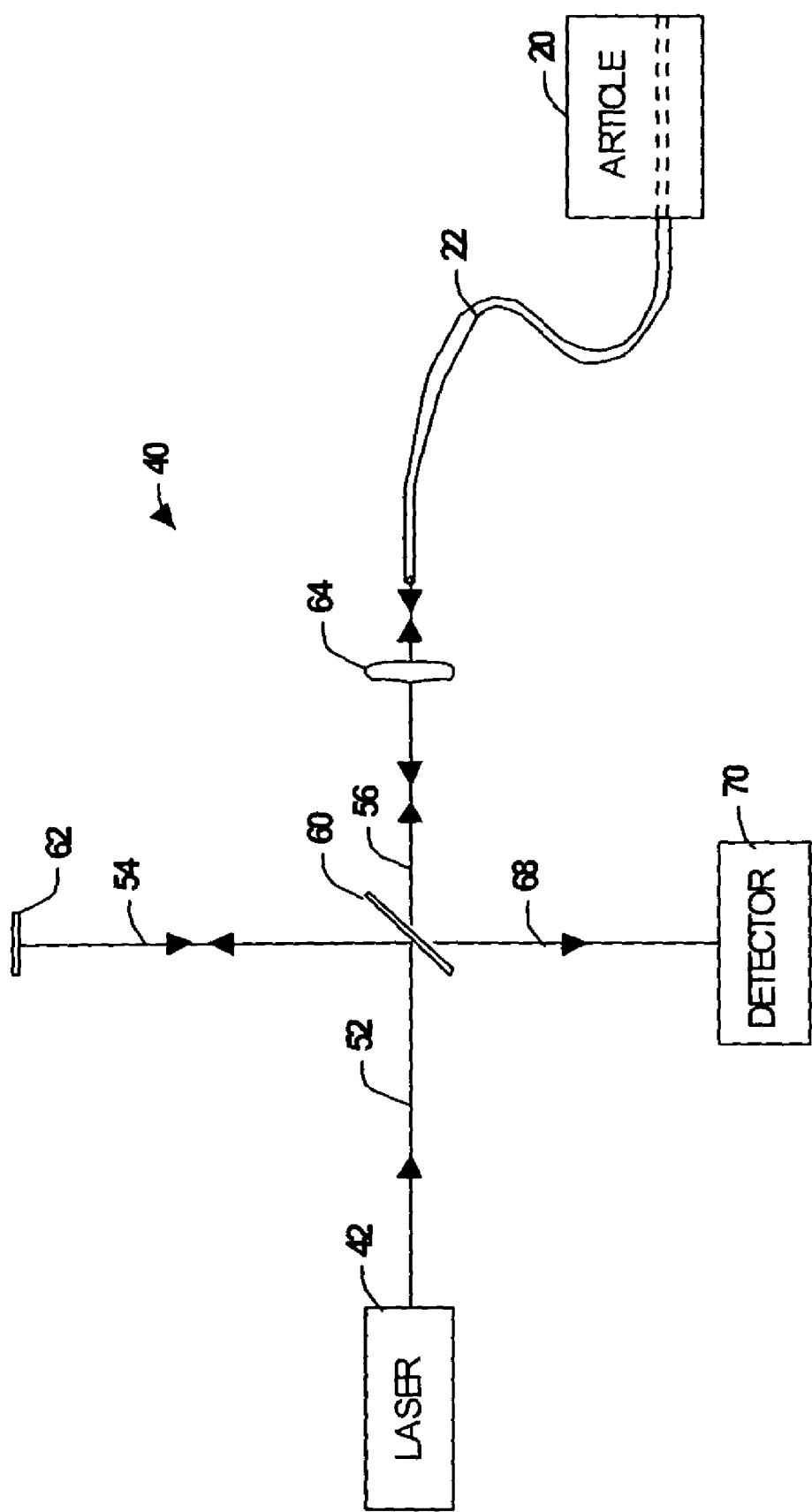

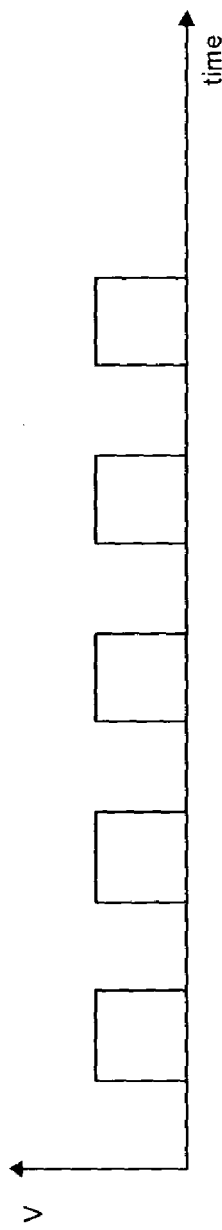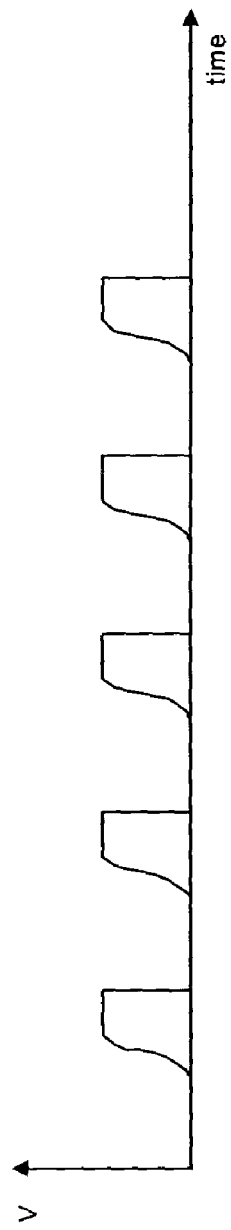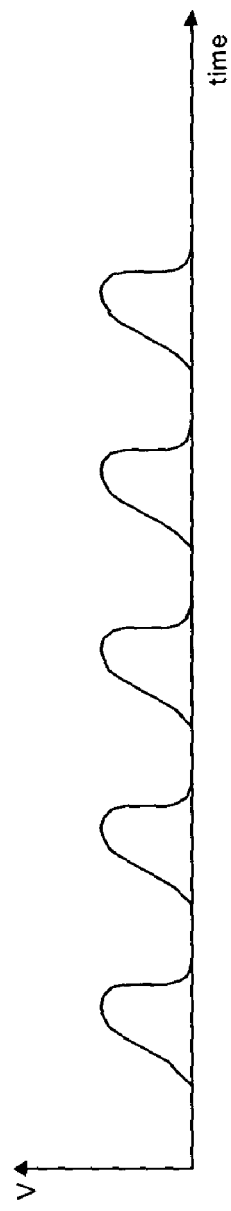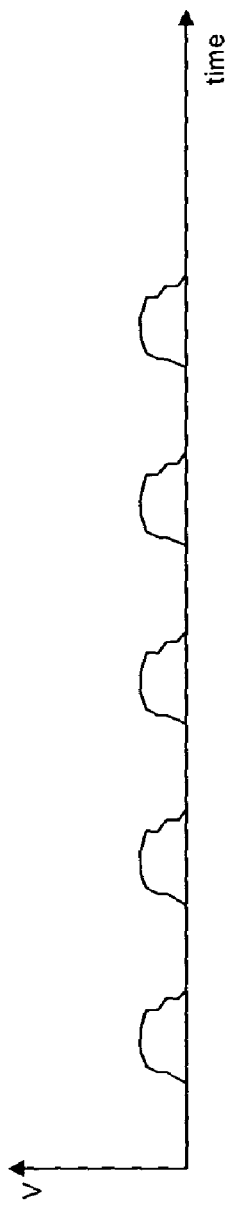

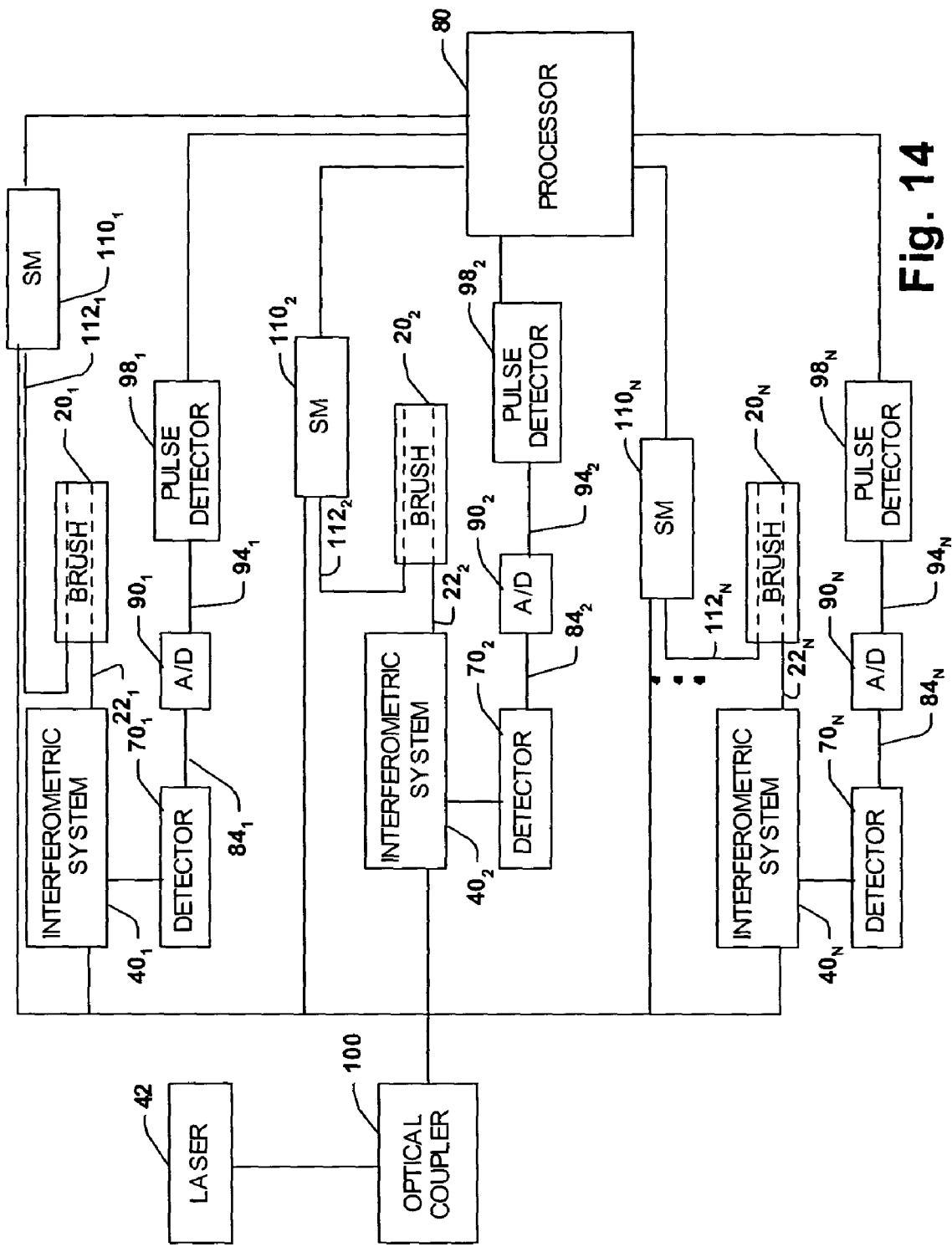

Fig. 15

| | PITCH BAR-MARKING | SLOT BAR-MARKING | COPPER DRAG | STREAKING | THREADING | GROOVING |
|---|---|---|---|---|---|---|
| BRUSH TYPE — POROUS BRUSH | | | | ▓ | ▓ | |
| BRUSH TYPE — ABRASIVE BRUSH | ▓ | | ▓ | ▓ | | ▓ |
| CONTAMINATION — DUST | | | | ▓ | ▓ | ▓ |
| CONTAMINATION — ABRASIVE | | | | ▓ | ▓ | ▓ |
| CONTAMINATION — GAS | | ▓ | ▓ | ▓ | ▓ | ▓ |
| ELECTRICAL ADJUSTMENT | | ▓ | | | | |
| ELECTRICAL OVERLOAD | | ▓ | | | | |
| LIGHT ELECTRICAL LOAD | | | | ▓ | ▓ | |
| ARMATURE CONNECTION | ▓ | | | | | |
| UNBALANCED SHUNT FIELD | ▓ | | | | | |
| BRUSH PRESSURE (LIGHT) | ▓ | | ▓ | ▓ | ▓ | |
| VIBRATION | ▓ | | ▓ | | | |

SYSTEM FOR MONITORING SUBSTRATE CONDITIONS

CROSS REFERENCE TO RELATED APPLICATIONS

This application is a continuation-in-part application of U.S. patent application Ser. No. 09/625,094 filed Jul. 25, 2000 entitled SYSTEM FOR MONITORING BEARING WEAR, which is a continuation-in-part of U.S. patent application Ser. No. 09/504,440 filed Feb. 16, 2000 now U.S. Pat. No. 6,359,690, entitled APPARATUS, SYSTEM AND METHOD FOR DETERMINING WEAR OF AN ARTICLE, which is a continuation of U.S. patent application Ser. No. 09/253,785 filed Feb. 22, 1999 entitled SYSTEM FOR DETERMINING WEAR OF AN ARTICLE (which issued as U.S. Pat. No. 6,067,159), which is a continuation of U.S. patent application Ser. No. 08/959,610 filed Oct. 28, 1997 entitled APPARATUS, SYSTEM AND METHOD FOR DETERMINING WEAR OF AN ARTICLE (which issued as U.S. Pat. No. 6,111,643), all of which are hereby fully incorporated by reference.

TECHNICAL FIELD

The present invention generally relates to systems and methods for monitoring substrate conditions, and more particularly to systems that utilize waveguides at least partially integrated into the substrate to monitor substrate conditions.

BACKGROUND OF THE INVENTION

Articles can wear over time, such as due to frictional contact, chemical machining, or abrasion, for example. One such article is a substrate, such as may be part of a semiconductor and/or part of a micro-electro-mechanical system (MEMS). By way of example, during a semiconductor fabrication process a substrate can undergo multiple iterations of processing steps, which can include, for example, etching, stripping, chemical mechanical polishing (CMP), and/or washing. During these steps, some of the substrate and/or some or all of one or more layers of material applied to the substrate can be selectively removed. For example, during CMP, one or more polishing and/or buffing pads having a certain degree of abrasiveness can be urged against and moved (e.g., rotated) relative to a surface of the substrate to remove, polish back and/or planarize the surface of the substrate and/or one or more layers of material formed thereon.

Additionally, polishing and buffing pads can themselves wear during CMP processing. For instance, polishing and buffing pads can become thinner due to mechanical loss of material as they polish and buff. These pads have to be replaced when they become overly thin and worn.

MEMS devices can also experience surface wear and material loss during normal operation. For instance, under typical operating conditions, one or more portions of a MEMS device frequently come into some type of frictional contact (e.g., sliding, rotating or otherwise) with another member, such as from the same or another MEMS device or another article with which the MEMS device is cooperating. As a result, one or more areas of the MEMS device can experience surface wear. Repeated exposure to such mechanical interaction can lead to device failure, inoperability or malfunction.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to systems and methods for monitoring a substrate. According to one aspect of the present invention at least one condition of a process associated with a substrate is monitored by utilizing an optical waveguide, at least part of which is integral with or embedded in the substrate. For example, the optical waveguide can be formed of a material that facilitates transmission of light through the waveguide and that has physical properties similar to the substrate itself. In this way, the waveguide can respond to process conditions and usage similarly as the substrate, such that variations in light transmitted in the waveguide and received at a measuring system can be employed to determine a condition or characteristic of the substrate and/or a process acting thereon.

According to one aspect of the invention a system is provided for determining at least one condition of a process associated with a substrate. The system includes at least one optical waveguide. The optical waveguide has first and second ends, where the first end receives a beam of light from a light source, and the second end extends to a location near a surface of the substrate. The system also includes measuring system operatively coupled to the optical waveguide to receive light from the waveguide that varies as a function of the at least one condition. The received light, for example, provides information indicative of a condition of the substrate and/or a process being performed relative to the substrate.

According to another aspect of the present invention, a substrate has an optical waveguide at least partially embedded within the substrate. The waveguide is embedded within the substrate such that a first end of the waveguide extends to a location near a surface of the substrate and wears substantially commensurate with wearing of the surface, and a second end of the waveguide receives light from a light source and provides light to an interferometric system configured to ascertain an indication of at least one condition of a process associated with the substrate based on the light received from the waveguide which varies as a function of the at least one condition.

According to another aspect of the present invention, a system for monitoring a MEMS device is provided. The system includes an optical waveguide at least partially embedded in the MEMS device such that a first end of the waveguide extends to a location near a surface of the device and wears substantially commensurate with wearing of the surface and a second end of the waveguide receives light from a light source. The system also includes an interferometric system operatively coupled to the waveguide and configured to ascertain an indication of at least one condition of a process associated with the MEMS device based on transmission of light received from the waveguide which vary as a function of the at least one condition.

According to yet another aspect of the present invention, a method for controlling a process associated with a substrate is disclosed. The method includes measuring at least one operating condition regarding the process with an interferometric system and an optical waveguide that is at least partially integrated into the substrate such that a first end of the waveguide extends to a surface of the substrate and a second end of the waveguide receives light from a light source. The process also includes controlling at least one operating parameter of the process in response to an indication of the at least one measured operating condition.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 3A–3F illustrate the use of an optical fiber in forming and polishing contacts in a semiconductor wafer in accordance with the present invention;

FIG. 11, a schematic diagram of an interferometric system in accordance with the present invention;

FIGS. 13B–13E are illustrations of waveforms representative of various surface conditions of a commutator in accordance with the present invention;

FIG. 14 is a schematic block diagram of another specific aspect of the present invention which provides for the determination of the amount of wear, the rate of wear, and surface assessment in connection with multiple articles in accordance with the present invention;

FIG. 15 is a representative lookup table which provides for narrowing down the possible causes for the wear/damage to a commutator surface in accordance with the present invention;

DESCRIPTION OF THE PREFERRED EMBODIMENTS

Figure 1:
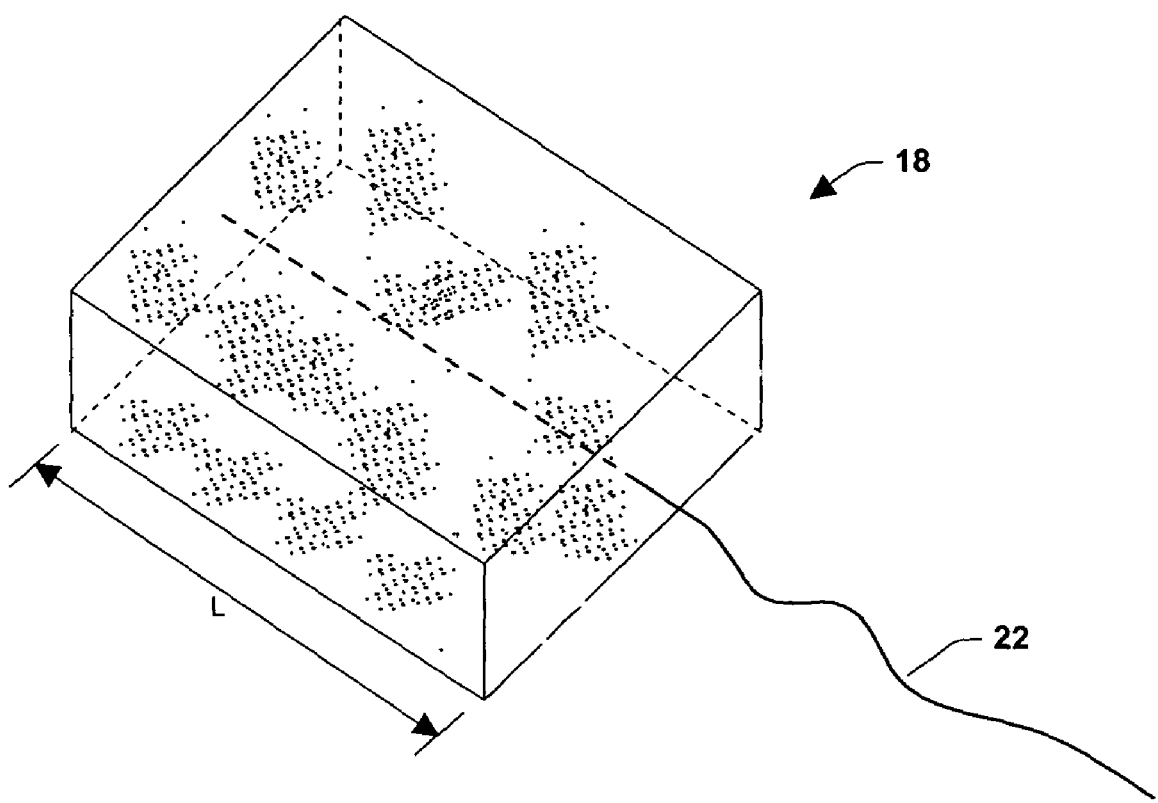
FIG. 1 is a perspective view of an article having an optical fiber embedded therein in accordance with the present invention.

The present invention will now be described with reference to the drawings, wherein like reference numerals are used to refer to like elements throughout.

The present invention employs optical signals (e.g., via optical fiber(s) embedded in an article) to provide data relating to the article and/or data relating to environmental conditions the article is subjected to. Such data can include, for example, the amount of wear and the rate of wear of the article. Furthermore, the present invention can provide data relating to surface condition assessment, article temperature and/or environment temperature, motor speed, and article pressure and/or environmental pressure.

Referring initially to FIG. 1, an article 18, such as can include, for example, a substrate and/or a micro-electro-mechanical system (MEMS), is shown in perspective view with an optical fiber 22 embedded therein. The optical fiber 22 is embedded such that its length direction is substantially parallel to the direction of wear of the article 18. Thus, as the article 18 wears over time due to contact with a surface 30 (FIG. 2), the end of the optical fiber will similarly wear and the length of the optical fiber decreases. The optical fiber 22 is substantially weaker than the surrounding contacting surface area of the article 18, and thus the optical fiber 22 wears substantially at the same amount and rate as the article 18 which the optical fiber 22 is embedded in.

In order to embed the optical fiber 22 in the article 18, a small cylindrical channel can be drilled through the body of the article. The diameter of the channel being slightly larger than the diameter of the optical fiber. The optical fiber 22 is strung through the article 18 so as to be taut within the channel. The fiber optic cable 22 may be secured within the channel with an epoxy type material. Fast curing epoxies (such as Devcon 5 Minute Epoxy) or adhesives that cure quickly when exposed to ultra-violet light (such as Norland 61) may be useful in some applications, and may be utilized to manufacture at least one specific aspect of the present invention. Any type of epoxy, glue or other means suitable for securing the fiber optic cable 22 within the channel may be employed as long as it does not exceed the hardness of the article 18, does not contaminate the article 18, fiber 22, or surface 30, and does not induce residual stress when cured, and does not score or mark the surface 30. The optical fiber 22 is configured so as to be flush with the end of the article 18 that comes into contact with surface 30.

Figure 2:
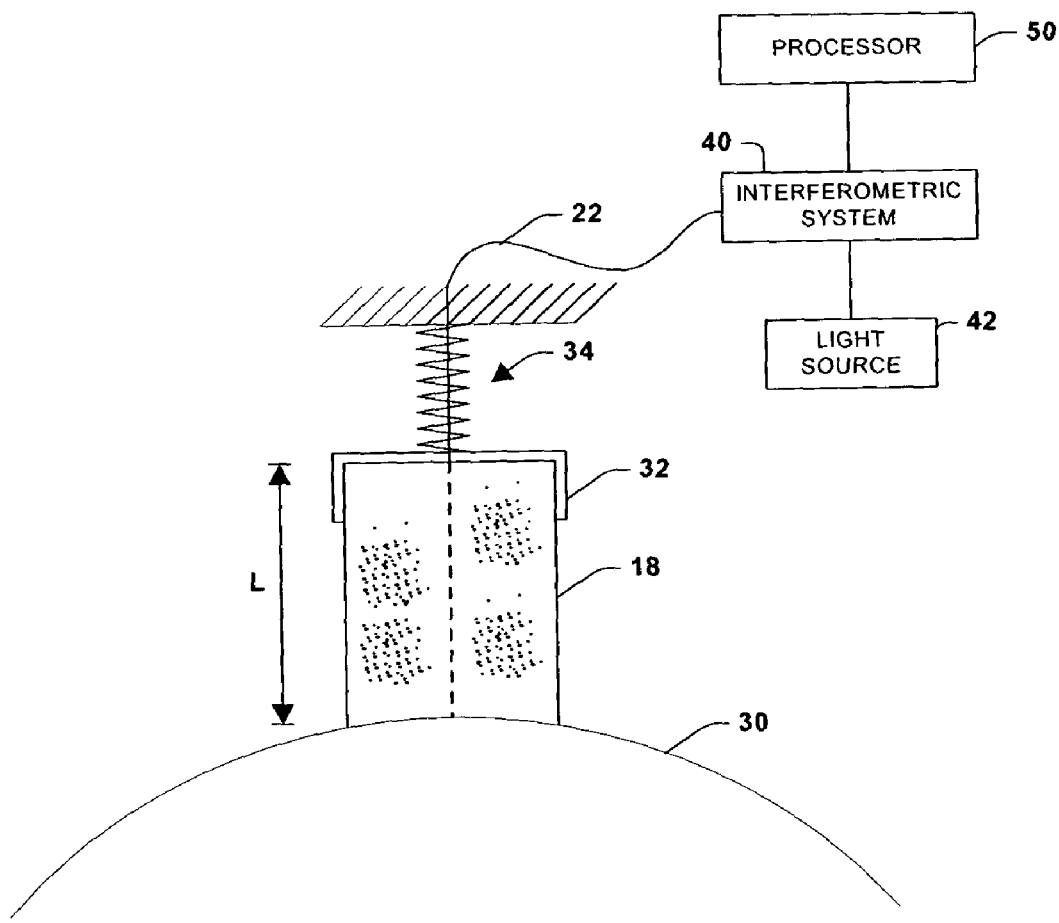
FIG. 2 is a is a functional schematic diagram of the integrated article and optical fiber in accordance with the present invention.

FIG. 2 is a schematic diagram of an integrated article 18 (e.g., substrate and/or MEMS) and optical fiber 22 in accordance with the present invention. A holder 32 is included in the illustration to represent the article 18 being held relative to a surface 30. The article 22 is depicted as contacting the surface 30, whereby the article experiences wear through repeated mechanical interaction with the surface. A spring 34 is included in the illustration and is coupled to the holder 32 to depict and/or model a biasing force that may urge the article into contact with the surface 30.

The optical fiber 22 is shown embedded in the article 18 such that one end is exposed to the surface 30. The other end of the optical fiber 22 is shown operatively coupled to an interferometric system 40 (which is discussed in greater detail below). The interferometric system 40 is operatively coupled to a light source 42 and a processor 50. It is to be appreciated that the interferometric system 40 and light source 42 could be integrated with the holder 32 or the article 18. In addition, the processor 50 may also be integrated with the holder 32 or the article 18. Furthermore, the interferometric system may include a wireless transceiver for wirelessly transmitting data to the processor 50.

As the article 18 is used it will wear as a result of engaging the surface 30. Thus, as the article wears 18, the length of the article 18 decreases and the holder 32 becomes closer in proximity to the surface. The length "L" of the optical fiber 22 will likewise wear as the length of the article 18 wears. However, the end of the optical fiber that is flush with the end of the article 18 will be in like proximity (of the article 18) to the surface 30 as a result of the optical fiber 22 being embedded in the article 18. Through interferometric techniques discussed in greater detail below, the amount of wear and rate of wear of the optical fiber 22 can be determined. Since the optical fiber 22 wears as a function of the wear of the article 18, the interferometric techniques provide for very accurately determining the amount of wear and rate of wear of the article 18.

As previously alluded to, one or more aspects of the present invention can have application to technologies such as semiconductor and/or micro-electro-mechanical system (MEMS) fabrication and/or usage. Semiconductor and MEMS wafers or substrates can undergo multiple iterations of processing steps, such as, deposition, etching, stripping, chemical mechanical polishing (CMP), and/or washing in modern fabrication. CMP is used to thin a wafer as well as for planarizing the dielectric between metal layers. An accurate method of determining the amount of material removed is important to the successful fabrication of these wafers. One or more optical waveguides or optical fibers can be embedded in the wafer during the fabrication process to facilitate this measurement. Such waveguides can be embedded, for example, in the center and near the periphery of the wafer. Wafer processing characteristics and material removal rates are generally not uniform across the wafer. Multiple points of observation allow additional data to be gathered on the wafer regarding operating conditions which can be utilized to control processing parameters and adjust operating characteristics to maximize the yield from a wafer run and/or maximize the usable devices from a wafer. The waveguides can be formed by doping variations in the substrate, embedding an optical fiber in a hole drilled by optical, mechanical or chemical means, or filling in a hole with a material that has an index of refraction greater than the silicon, passivation layers and polishing compound. Applying a small amount of doping materials to the silicon substrate in a channel or waveguide configuration changes the index of refraction permitting the structure to confine directed light into a waveguide. Coherent light can then shine through the waveguides and be reflected back from the interface between the wafer and the polishing material. The length of the waveguide is readily determined by the interference pattern created by the reflected light and a reference path.

For example, FIGS. 3A–3F illustrate the use of an optical fiber in forming and polishing contacts in a semiconductor and/or MEMS substrate (e.g., wafer) in accordance with one or more aspects of the present invention. With regard to the description in connection with the example of FIGS. 3A–3F, the terms wafer or substrate include not only a semiconductor or MEMS substrate, but also any and all layers and structures fabricated over the substrate up to the point of processing under discussion.

FIG. 3A illustrates a semiconductor device 300 including an insulating layer 306 which is formed on a substrate 304. Substrate 304 may be any suitable semiconductor material such as, for example, a monocrystalline silicon substrate. Any suitable technique (e.g., thermal oxidation, plasma enhanced chemical vapor deposition (CVD), thermal enhanced CVD and spin on techniques) may be employed in forming the insulating layer 306. The insulating layer 306 can be, for example, silicon dioxide ($SiO_2$) with a thickness of about 0.8 to 1.0 microns. It will be appreciated, however, that other suitable insulating materials can be utilized, such as silicon nitride ($Si_3N_4$), (SiN), silicon oxynitride ($SiO_xN_y$), and fluorinated silicon oxide ($SiO_xF_y$), and polyimide(s), for example.

An optical fiber 302 is embedded in the device 300 extending generally perpendicular to the top surface of the device 300. It is to be appreciated, however, that the silicon material may itself function as the media for optical transmission. In such a case, about 1310 or 1550 nm light may, for example, be utilized as this is the approximate range around which silicon material becomes transparent. This is also the wavelength frequently used for optical telecommunications and for which many low cost source and detector devices are available.

The optical fiber 302 may be coupled to an interferometric system 40 and a processor 50, as previously mentioned. A source and detector of the interferometric system 40 may also be fabricated on the same silicon chip as may be done with vertical cavity surface emitting lasers (VCELS). Additional enhancements to the accuracy and ability to measure different parameters can be facilitated through the use of wave division multiplexing (WDM) and dense wave division multiplexing (DWDM) techniques. A single laser source may feed multiple measurement points via beam splitting. The optical fiber 302 should be made of a material conducive to semiconductor or MEMS processing, such as a material having about the same selectivity to processes performed relative to the various layers of the device 300. A distal end of the optical fiber 302 is positioned at a location that is adjacent to or in contact with the surface being processed. For example, where a layer 308 is being formed, the end of the waveguide 302 can be at the surface of the layer 306. It is to be appreciated that, while a single fiber is included in the example shown, any number of optical fibers can be embedded at various locations throughout a substrate to facilitate measuring and controlling wear as well as uniformity and/or amount of material removed in polishing or stripping layers of material applied to the substrate.

By way of illustration, a thin photoresist layer 308 is formed on the insulating layer 306. The thin photoresist layer 308 has a thickness of about 500 Å–5000 Å, although it is to be appreciated that the thickness thereof may be of any dimension suitable for carrying out the present invention. Accordingly, the thickness of the thin photoresist layer 308 can vary in correspondence with the wavelength of radiation used to pattern the thin photoresist layer 308. One aspect of the present invention provides for forming the thin photoresist layer 308 to have a thickness within the range of 1000 Å to 4000 Å. Another aspect of the present invention provides for forming the thin photoresist layer 308 to have a thickness within the range of 2000 Å to 3000 Å. Yet another aspect of the present invention provides for forming the thin photoresist layer 308 to have a thickness within the range of 500 Å to 2000 Å. The thin photoresist layer 308 may be formed over the insulating layer 306 via conventional spin-coating or spin casting deposition techniques, for example.

The thin photoresist layer 308 has a thickness suitable for functioning as a mask for etching the underlying insulating layer 306 and for forming patterns or openings in the developed thin photoresist layer 308. The photoresist layer 308 is patterned using conventional techniques to form a first opening 310 (FIG. 3B). The size of the first opening 310 is about the size of an ultimate via. The patterned photoresist 308 serves as an etch mask layer for processing or etching the underlying insulating layer 306.

An etch step 320 (e.g., anisotropic reactive ion etching (RIE)) (FIG. 3C) is performed to form one or more vias or trenches (e.g., that define a pattern) 315 (FIG. 3D) in the insulating layer 306. The patterned photoresist 308 is used as a mask for selectively etching the insulating layer 306 to provide a patterned insulating layer 306. Any suitable etch technique may be used to etch the insulating layer 306. For example, a selective etch technique may be used to etch the material of the insulating layer 306 at a relatively greater rate as compared to the rate that the material of the patterned photoresist 308 is etched. The optical fiber 302 can be used to measure and control the depth of the etching step 320 such as through surface light loss. The optical fiber 302 can also provide depth information to the processor 50 via the interferometric system 40. This information can be transmitted to the anisotropic reactive ion etcher to control the extent of the etching. A second optical fiber 302' can be employed for monitoring and limiting the etching depth. The second optical fiber 302' can have a length such that a measuring end of the second optical fiber 302' extends to the desired depth of the via 315.

Additionally or alternatively, as mentioned above, by forming the optical fiber 302 with a material having about the same selectivity to the etchant as the insulating layer 306, the fiber will be etched away at substantially the same rate as the insulating layer. As a result, the measurements can be made with the interferometric system 40 to determine an etching depth and/or etch rate, which can be used to control the etching process.

Figure 3D:
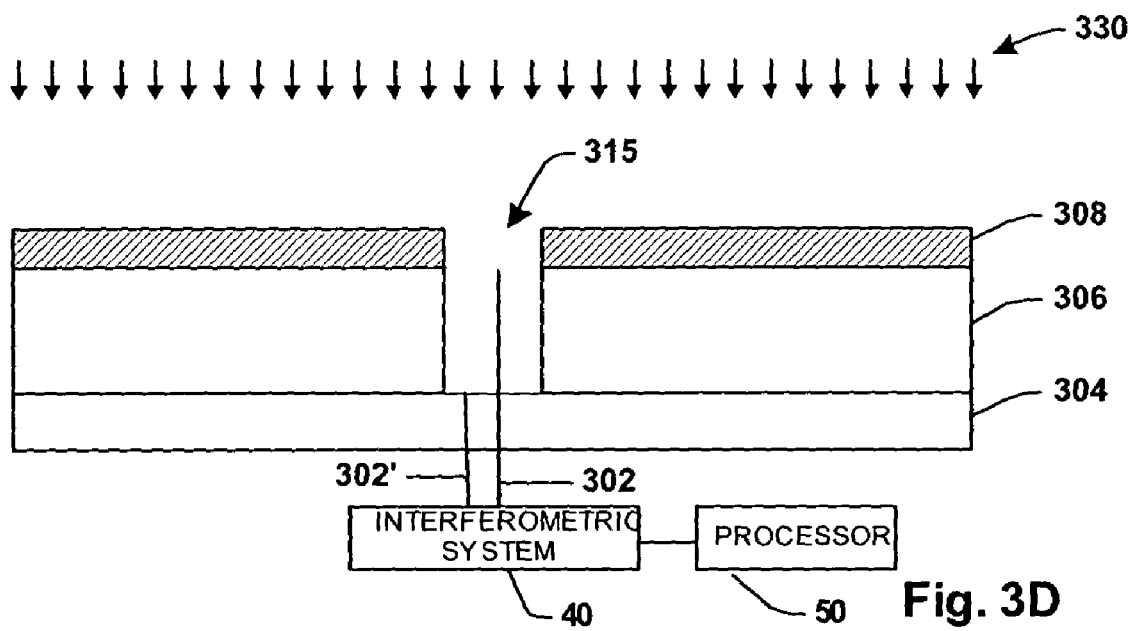
Figure 3E:
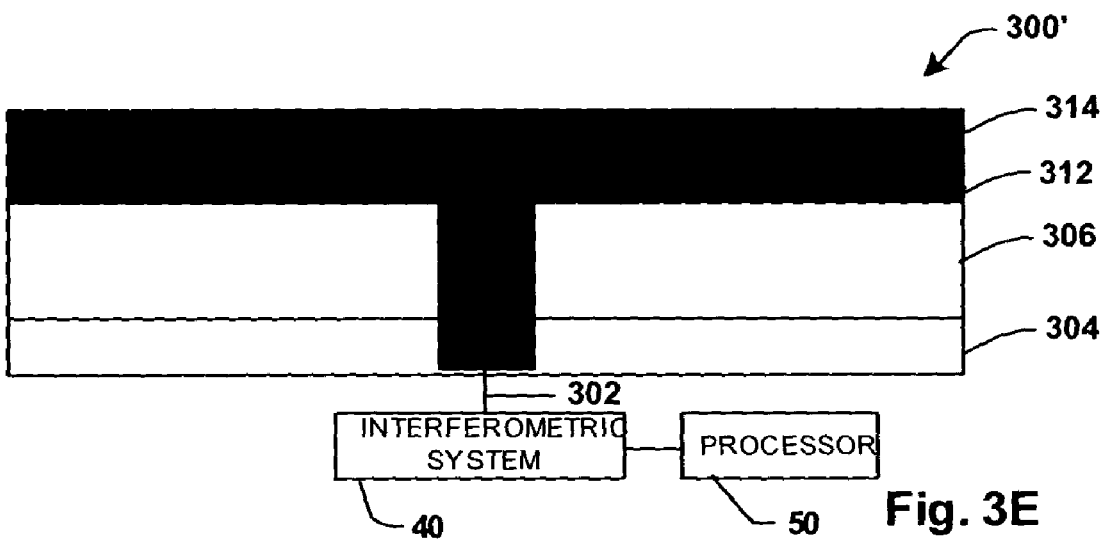
Figure 3F:
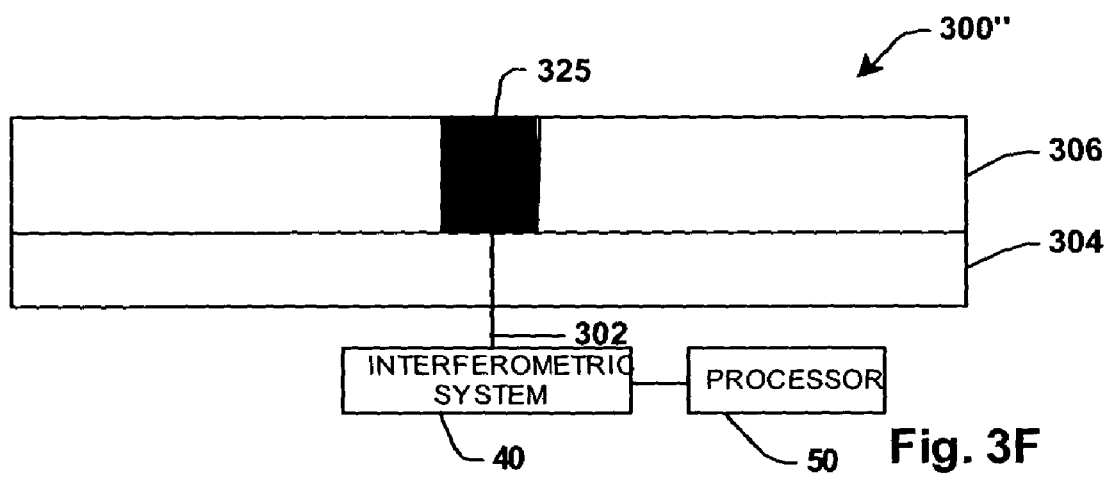

FIG. 3D illustrates a stripping step 330 (e.g., ashing in an $O_2$ plasma) to remove remaining portions of the photoresist layer 308. Next, a deposition step is performed on the structure 300' (FIG. 3E) to form a protective layer 312 over the structure 300'. The deposition step also includes depositing a metal contact layer 314. FIG. 3F illustrates the structure 300" after a polished back step (e.g., via chemical mechanical polishing (CMP)) has been performed to remove a predetermined thickness of the protective layer 312 and the metal contact layer 314. The polish back step includes using a polish that is selective to removing the metal layer as compared to the insulating layer.

As can be seen in FIGS. 3A–3F, the optical fiber 302 is embedded in the structure 300. The optical fiber 302 is embedded such that its length direction is substantially parallel to the direction of polishing of the structure. Thus, as the structure 300 is polished, the end of the optical fiber 302 will similarly wear and the length of the optical fiber 302 decreases. Since the optical fiber 302 is made of a material conducive to processing, the optical fiber 302 wears substantially at the same amount and rate as the structure which the optical fiber 302 is embedded in. Again, the interferometric system 40 can provide this information to the processor 50 for controlling the amount and uniformity of the processing steps. Substantial completion of the steps results in a structure 300" shown in FIG. 3F. The structure 300" includes the substrate 304, the insulating layer 306 and a contact 325 connecting the semiconductor substrate 304 to a top surface of the insulating layer 306.

The polishing and buffing pads used, for example, in the CMP process (in addition to polishing and buffing pads used for other processes) also exhibit wear and can employ optical fibers to measure this wear. Polishing and buffing pads become thinner due to mechanical loss of material as they polish and buff. These pads need to be replaced when they become too thin. Monitoring their thickness during polishing/buffing allows a timely and resource efficient method of determining when to replace the pad.

Figure 4:
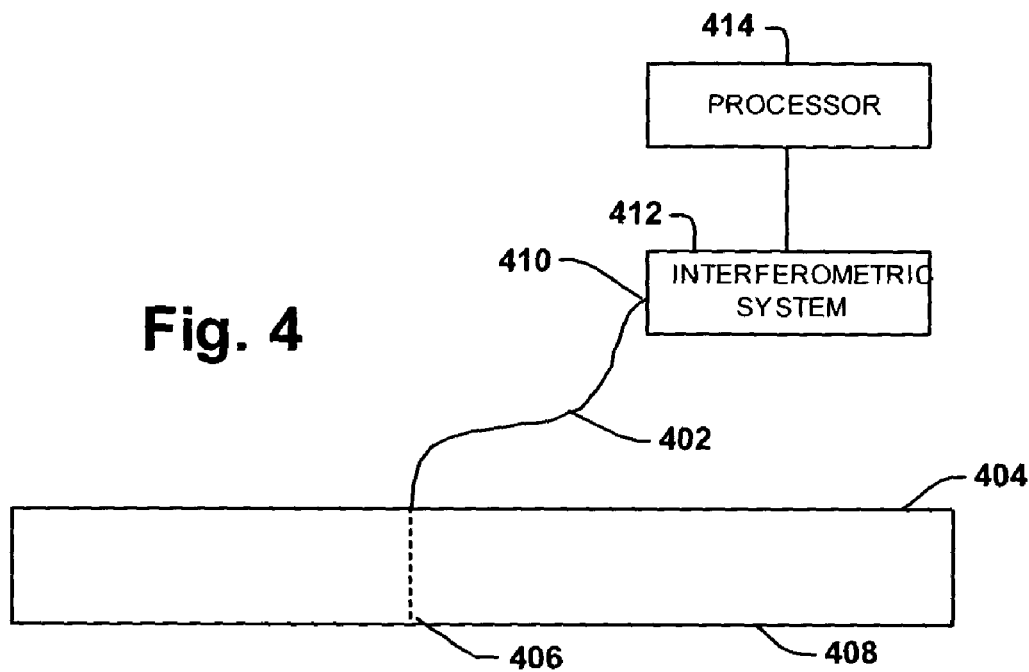
FIG. 4 is a schematic diagram illustrating the present invention as employed in a polishing pad.

As illustrated in FIG. 4, fiber optics (e.g., one or more optical fibers 402) can be embedded in a CMP pad 404 according to an aspect of the present invention. In the example shown, one end 406 of a fiber 402 extends to a surface 408 of the pad 404 that wears as the pad 404 polishes. Another end 410 of the optical fiber 402 is coupled to an interferometric system 412 linked to a processor 414. As the pad 404 becomes thinner, the length of the fiber will change proportionally. By way of example, a coherent light source can be employed to inject light into the fiber via the interferometric system 412. The resulting interference patterns developed by the reflected light can, in turn, be observed to allow accurate measurement of material wear. By way of illustration, the fiber optic material (and its cladding) is of the same hardness (or less) as the buffing pad 404 and the material should not degrade the polishing operation. Adding optical temperature measurement and/or pressure measurement through the optical fiber permits monitoring critical material buffing parameters. The interpretation of these processing parameters can prevent scoring or improper polishing that may damage the wafer.

Figure 5:
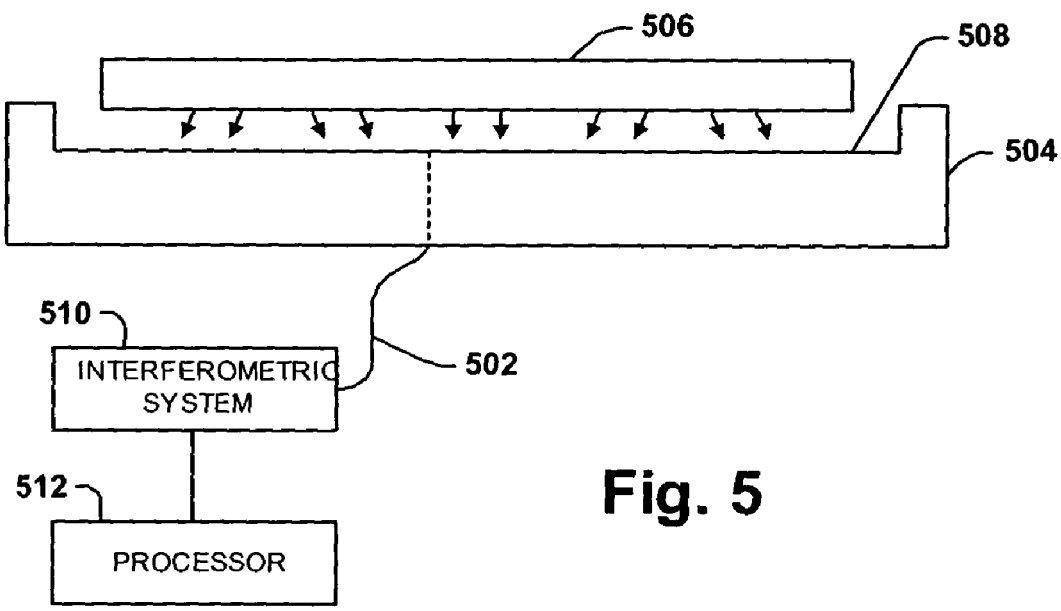
FIG. 5 is a schematic diagram illustrating the present invention as employed in a MEMS device.

Turning to FIG. 5, one or more aspects of the present invention also facilitates optical monitoring of MEMS devices which can experience surface wear during normal operation resulting from mechanical sliding or other frictional movement, which can ultimately lead to device malfunction and/or failure. More particularly, one or more optical fibers 502 can be embedded in a portion 504 of a MEMS device that comes into contact (e.g., sliding, rotating or otherwise) with another member 506, such as of the same or other MEMS device or of another article with which the MEMS device cooperates. The fiber 502 can be oriented substantially perpendicular to a surface 508 of the portion 504 of the MEMS device that may wear as a result of the contact. The fiber 502 is made of a material that is of substantially the same hardness or less hard as that of the portion 504 so that as the surface 508 wears, the fiber 502 wears commensurately. The fiber 502 is operatively coupled to an interferometric system 510, which is linked to a processor 512. Optical monitoring of wear can be utilized to indicate abnormal operation and also to predict the remaining number of actuation cycles or remaining useful life of a MEMS device. While for sake of brevity a single optical fiber is illustrated in FIG. 5, those skilled in the art will understand and appreciate that a plurality of such optical fibers at spaced apart locations could be used to monitor wear at different locations, such as to generate a wear profile for the surface 508.

Figure 6:
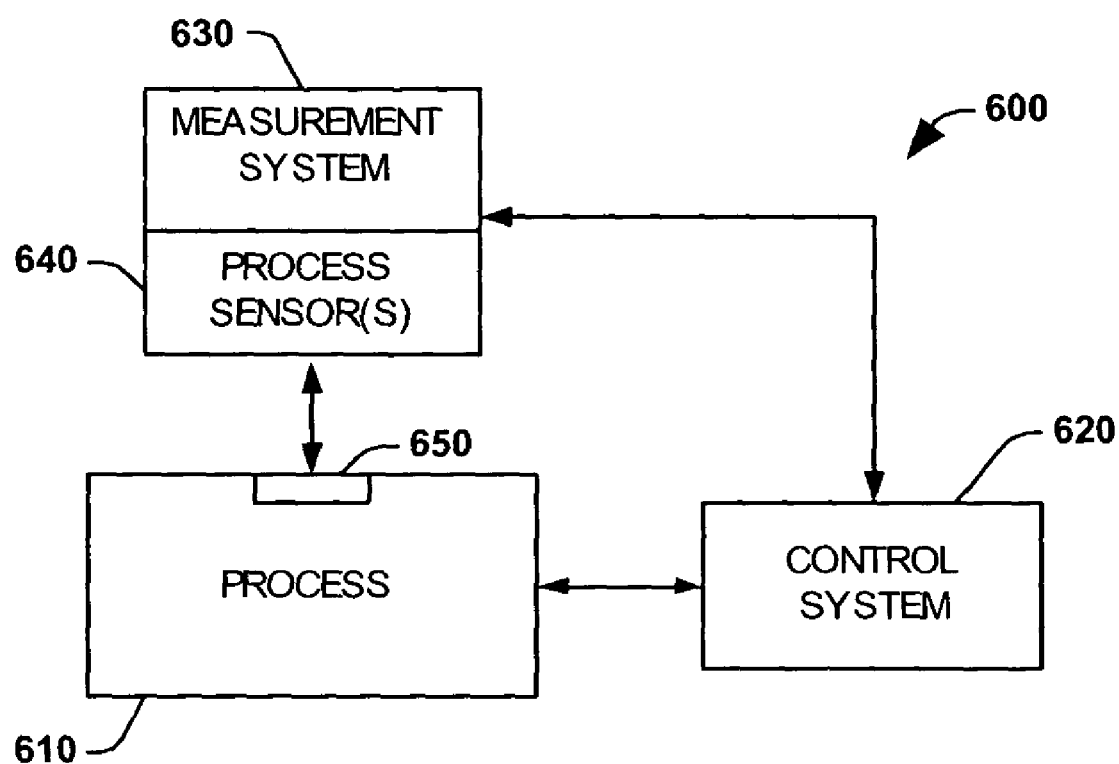
FIG. 6 is a partial schematic diagram illustrating a system that facilitates controlling a semiconductor fabrication process and/or a MEMS fabrication process in accordance with one or more aspects of the present invention.

FIG. 6 illustrates a system 600 that facilitates controlling a semiconductor fabrication process and/or a MEMS fabrication process 610 in accordance with one or more aspects of the present invention. The process 610 may include, for example, one or more iterations of deposition, etching, stripping, chemical mechanical polishing (CMP), and/or washing steps, which may be performed on a wafer or substrate.

The system 600 includes a control system 620 for controlling or regulating operating characteristics of the process 610. Operating characteristics associated with the process 610 may include, for example, temperature and/or pressure associated with the process, timing parameters associated with the process, excitation voltages associated with the process, and/or the concentration, distribution or species of gases or chemicals, such as polishing slurries, administered during the process.

A measurement system 630 is operatively associated with the process 610 to monitor one or more various operating conditions of the process. More particularly, one or more process sensors 640 of the measurement system 630 are associated with the process 610 to selectively monitor operating conditions. These operating conditions may be indicative of one or more operating characteristics of the process 610 and, as such, the control system 620 may utilize one or more of the sensed operating conditions to selectively adjust one or more operating parameters of the process 610 to control the aforementioned (or other) operating characteristics to achieve a desired result (e.g., desired thickness and/or uniformity).

By way of example, the measurement system 630 may be operatively associated with the process 610 to measure operating conditions such as thickness, degree of wear, rate of change in thickness (e.g., due to deposition, etching or polishing), rate of wear and/or uniformity of material thickness, such as described above with respect to FIGS. 3A–3F, 4 and 5. In particular, the measurement system 630 may include an interferometric system (not shown), a portion 650 of which may be located within the process 610, such as may be integral with a substrate or polishing pad as described above with respect to FIGS. 3A–3F, 4 and 5. The measurement system 630 may include, for instance, a plurality of optical fibers scattered throughout the wafer, MEMS device, and/or a polishing pad to sample and monitor associated conditions at multiple locations, such as to enable a better determination of thickness and/or uniformity. Interferometric techniques are discussed in greater detail below, however, in general the length of a light path on a reference beam can be controlled by adjusting the position of a reflector on a reference arm. The control can be done so as to maintain a particular fringe (e.g., interference) pattern. The amount of adjustment needed for the reference beam to maintain a fixed interference pattern, generally corresponds to the change in length of the measurement path and therefore is indicative of processing conditions (e.g., temperature, pressure, amount of material removed). Thus, through suitable monitoring and control, the amount of material removed and the rate of material removal, for example, can be determined.

In accordance with one or more aspects of the present invention, the control system 620 may utilize the measurements from the measurement system 630 to facilitate adjusting one or more operating parameters of the fabrication process 610 to achieve a desired result (e.g., desired thickness or uniformity) or operating characteristic for the process. The control system 620 may also include memory (not shown) adapted to store expected operating characteristics for the various operating parameters of the process, for example. The control system 620 may, for example, be programmed and/or configured to compare measured values to target values to determine what action (if any) should be taken to drive the process 610 so that a targeted result may be achieved.

According to another aspect of the present invention, such a system may also be utilized to monitor and control wear, rate of wear and/or anticipated remaining life of a MEMS device, where the process 610 corresponds to a process of using a MEMS device, rather than the fabrication thereof. For example, typical operation of a MEMS device includes actuation of micro-parts which can wear as a result of frictional contact and/or repetitive movement. The measurement system 630 can monitor, for example, operating conditions, such as, degree of wear per a fixed number of iterative movements. In particular, the portion 650 of the measurement system 630 which may be integral with the MEMS device may include one or more optical fibers of an interferometric system as described above with respect to FIGS. 3A–3F, 4 and 5. The portion 650 may sense, for instance, the amount of wear a surface of the MEMS device experiences after the device is actuated a certain number of times. The control system 620 can utilize such sensed conditions (which are indicative of operating characteristics, such as, pressures applied to a surface of the MEMS device) to selectively adjust one or more operating parameters (e.g., force with which contacting surfaces are urged together, rates at which contacting surfaces are brought together, rate of movement required to extend device life) of the process 610 to control operating characteristics and achieve a desired result (e.g., to extend the lifetime of the MEMS device and/or to predict a projected failure date of the MEMS device so that replacement and/or servicing arrangements can be made).

Figure 7:
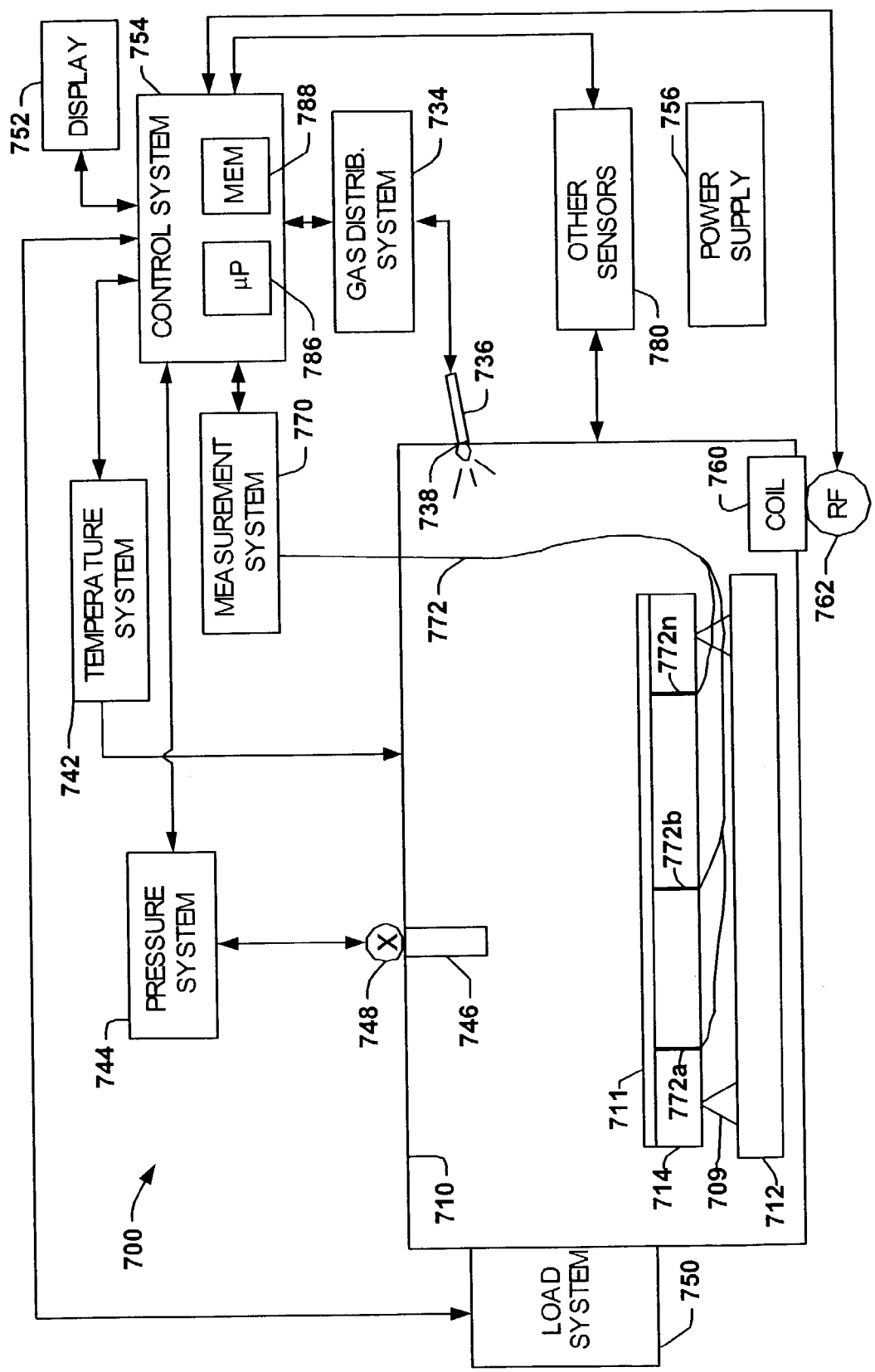
FIG. 7 is a schematic diagram illustrating a material deposition stage in a semiconductor and/or MEMS fabrication system having a control system situated therein according to one or more aspects of the present invention.

FIG. 7 illustrates a semiconductor and/or MEMS fabrication system 700 having a control system situated therein according to one or more aspects of the present invention. In particular the system facilitates a material deposition stage of a fabrication process. The fabrication system 700 includes a process chamber 710 having a support, such as may include a stage 712 (or chuck) having pins 709 operative to support (e.g., via vacuum) a substrate, such as a wafer 714, which may comprise any suitable semiconductor material such as, for example, a monocrystalline silicon substrate.

A gas distribution system 734 is also operably coupled to the chamber 710 to selectively provide gaseous chemicals into the chamber based upon, among other things, the size of the chamber 710. The gases alone or in combination with other elements are utilized, for example, to facilitate forming layers 711 on the wafer 714 via any suitable technique (e.g., chemical vapor deposition (CVD), low pressure CVD (LPCVD), plasma enhanced CVD (PECVD), thermal enhanced CVD, rapid thermal CVD (RTCVD), physical vapor deposition (PVD), metal organic CVD (MOCVD)).

By way of illustration, the gas distribution system 734 includes a source of a gaseous medium (a vapor) of one or more chemicals that are to be formed on the substrate. The gas is provided into the chamber 710 through a conduit 736 that terminates in a nozzle 738. While, for purposes of brevity, a single nozzle 738 is shown in FIG. 6, it is to be appreciated that more than one nozzle or other gas delivery mechanisms may be utilized to provide gas into the chamber 710 at various mixtures and/or concentrations.

A temperature system 742 also is provided for selectively regulating the temperature within the chamber 710. For example, the system 742 may be a diffusion type system (e.g., a horizontal or vertical furnace) operable to diffuse heat into the chamber 710. The temperature system 742 may implement its own temperature control process or such control may be implemented as part of other sensors operatively associated with the chamber 710.

Similarly, a pressure system 744 may be included to selectively regulate the pressure within the chamber. The pressure system 744 may include, for example, one or more vent conduits 746 having one or more valves 748 that may be selectively adjusted to be opened and/or closed to varying degrees to assist with regulating the pressure within the processing chamber 710. Alternatively or additionally, the pressure system 744 can include a source of clean pressurized air coupled to the chamber 710 to maintain a desired pressure in the chamber.

The system 700 may also include a load system 750 operatively connected to the processing chamber 710 for loading and unloading wafers into and out of the chamber. The load system 750 typically is automated to load and unload the wafers into the chamber at a controlled rate, for example. The system further may include a display 752 operatively coupled to a control system 754 for displaying a representation (e.g., graphical and/or textual) of one or more process conditions. In accordance with an aspect of the present invention, the thickness or amount of material 711 deposited on the wafer 714 or other sensed process conditions can, for example, be presented on the display 752.

A power supply 756 is also included to provide operating power to components of the system. Any suitable power supply (e.g., battery, line power) may be implemented with the present invention. The exemplary system 700 shown includes a coil 760 and an RF excitation (e.g., voltage) source 762 operatively coupled to the control system 754. The control system 754 controls the RF excitation source 762 so as to electrically excite the coil 760 which in turn electrically excites one or more gases within the chamber to develop a seasoning plasma, for example.

A measurement system 770 is optically coupled with one or more waveguides 772a thru 772n (collectively referred to as 772, n being a positive integer) to form a monitoring system according to an aspect of the present invention. The waveguides 772a thru 772n are integral with the wafer 714 to measure operating condition as discussed above with respect to FIGS. 3A–3F, 4, 5 and 6 (e.g., via interferometric techniques). More particularly, the measurement system includes one or more sources of light that provide light to the respective waveguides 772. The light can be at different wavelengths to enable monitoring different operating conditions indicative of process characteristics, for example. The measurement system monitors (e.g., through interferometric techniques) light characteristics associated with each of the waveguides 772 during processing within the chamber. Monitored characteristics can be utilized to measure the thickness of material 711 deposited on the wafer 714, such as through surface light loss. In the example illustrated, the waveguides 772 are oriented generally perpendicular to the surface of the substrate. It is to be appreciated that, for purposes of the present invention, any number of the waveguides may be arranged in any number of schemes (e.g., linear, grid, circular, random arrangements) to provide information from various locations throughout wafer 714. It is to be further appreciated that the waveguides and measurement system may also be employed in a test wafer in establishing and setting operating parameters for a fabrication system. Information obtained by the measurement system is provided to the control system 754.

In the example illustrated, one or more other sensors 780 are also included to monitor and/or measure selected processing conditions within the chamber 710. The other sensors 780 may include, for example, a temperature sensor, mass flow sensor for gases, a pressure sensor, etc. The various other sensors 780 can provide respective signals to the control system 754 regarding the measured conditions. The control system 754 can in turn analyze the conditions indicated by the received signals, including those from the measurement system 770, to discern whether the fabrication process is proceeding as intended.

The control system 754 can utilize the measured conditions to control operating characteristics associated with the process by providing appropriate control signals to the associated systems (e.g., gas distribution system 734, temperature system 742, pressure system 744). Such control signals may selectively adjust respective operating parameters of the systems to achieve a desired result. For example, where the material is being deposited on the wafer too quickly, a control signal from the control system 754 can cause the gas distribution system 734 to emit gasses at a reduced rate and/or volume.

By way of example, the control system 754 includes a processor 786, such as a microprocessor or CPU, coupled to a memory 788. The processor 786 receives measured data from the measuring system 770 and corresponding other data from the other sensors 780. The processor 786 may also be operatively coupled to the gas distribution system 734, the temperature system 742 and/or the pressure system 744. The control system 754, and more particularly the processor 786, may be programmed/and or configured in any suitable manner to control and operate the various components within the system in order to carry out the various functions described herein.

The processor 786 may be any of a plurality of processors. The manner in which the processor 786 can be programmed to carry out the functions relating to the present invention will be readily apparent to those having ordinary skill in the art based on the description provided herein.

The memory 788 serves to store, among other things, program code that may be executed by the processor 786 for carrying out operating functions of the system as described herein. The memory 788 may include read only memory (ROM) and random access memory (RAM). The ROM contains among other code the Basic Input-Output System (BIOS) which controls the basic hardware operations of the system. The RAM is the main memory into which the operating system and application programs are loaded. The memory 788 also serves as a storage medium for temporarily storing information such as target values, coordinate tables, patterns against which observed data can be compared, and algorithms that may be employed in carrying out one or more aspects of the present invention, for example. For mass data storage, the memory 788 may further include a hard disk drive.

As such, the memory 788 may also function as a data store serving, for example, as a signal (signature) library that can be populated with an abundance of signatures against which one or more measurements can be compared. Entries in the data store can be stored along with the operating parameters under which they were obtained (e.g., temperature, pressure, gas distribution volume/rate) and relations can be formed to facilitate correlating process parameters. One or more measured deposition rate values can be compared, for example, to one or more entries within the data store (e.g., by direct matching, interpolation or otherwise) to generate feed forward/backward control data to control one or more operating parameters of one or more the fabrication processing components to achieve a desired result.

Signatures can be obtained manually to populate the data store by observing the operating conditions generated during a training session, for example. Alternatively, or in addition to manually observing values, simulation, modeling and/or artificial intelligence techniques can be employed to populate the data store with signatures against which measured values can be compared.

In addition, processing parameters including the amount and rate of material removal may be recorded and stored in memory. This data can later be correlated with device (e.g., MEMS or Integrated Circuit) operating characteristics and performance. Future semiconductor fabrication processes can use this information to direct processing parameters toward more desirable levels and to predict the performance of devices yet to be manufactured.

It is to be appreciated that such a data store can store data in data structures including, but not limited to, one or more lists, arrays, tables, databases, stacks, heaps, linked lists and data cubes. Furthermore, the data store can reside on one physical device and/or may be distributed between two or more physical devices (e.g., disk drives, tape drives, memory units). In the example shown in FIG. 6, the memory 788 thus can correlate stored signatures with sensed information (e.g., with other process parameters). The control system 754 may be employed to update the stored signatures in the memory 788 (e.g., via the measurement system 770, other sensors 780). Alternatively, the measurement system 770 and sensors 780 can be coupled directly to the memory 788 to populate the data store, such as during a data gathering or learning mode.

As a result, the system 700 provides for monitoring and selectively controlling components of the fabrication process. Monitored conditions provide data based on which the control system 754 may implement feedback/feed forward process control, alone or in combination with other stored data, so as to form a semiconductor and/or MEMS device having desired features (e.g., layer thickness and/or uniformity).

Figure 8:
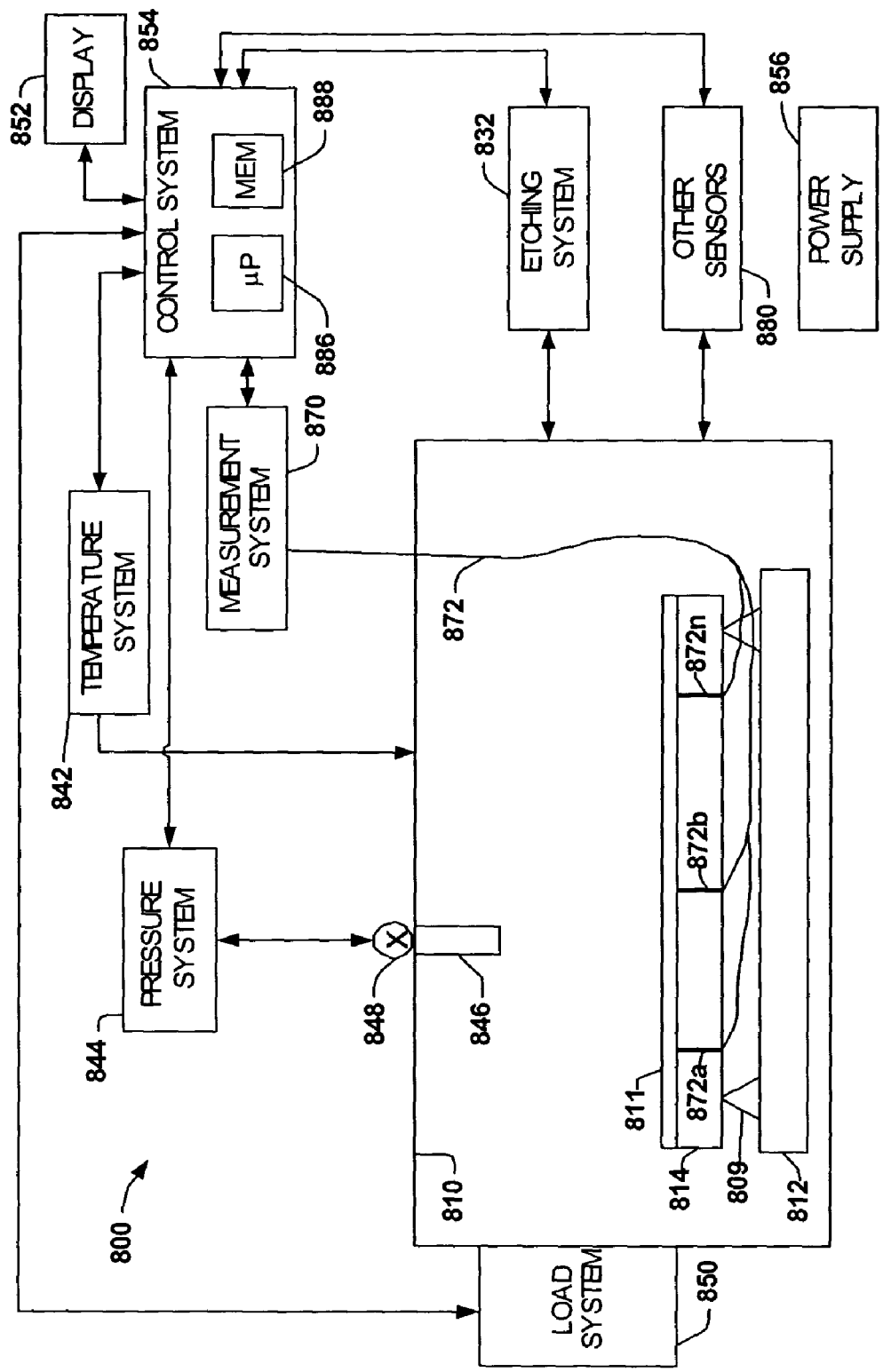
FIG. 8 is a schematic diagram illustrating an etching or stripping stage in a semiconductor and/or MEMS fabrication system having a control system situated therein according to one or more aspects of the present invention.

Turning to FIG. 8, a fabrication system 800 for a semiconductor and/or MEMS device having a control system situated therein according to one or more aspects of the present invention is illustrated. In particular, the system illustrated facilitates an etching or stripping stage of a fabrication process. The fabrication system 800 includes a process chamber 810 having a support, such as may include a stage 812 (or chuck) having pins 809 operative to support (e.g., via vacuum) a substrate, such as a wafer 814, which may comprise any suitable semiconductor material such as, for example, a monocrystalline silicon substrate.

An etching system 832 is operatively coupled to the chamber 810 to selectively provide etchants as well as other material ingredients into the chamber 810 to facilitate wafer etching or removal of material 811 deposited onto the surface of the wafer.

A temperature system 842 also is provided for selectively regulating the temperature within the chamber 810. For example, the system 842 may be a diffusion type system (e.g., a horizontal or vertical furnace) operable to diffuse heat into the chamber 810. The temperature system 842 may implement its own temperature control process or such control may be implemented as part of other sensors operatively associated with the chamber 810.

Similarly, a pressure system 844 may be included to selectively regulate the pressure within the chamber. The pressure system 844 may include, for example, one or more vent conduits 846 having one or more valves 848 that may be selectively adjusted to be opened and/or closed to varying degrees to assist with regulating the pressure within the processing chamber 810. Alternatively or additionally, the pressure system 844 can include a source of clean pressurized air coupled to the chamber 810 to maintain a desired pressure in the chamber.

The system 800 may also include a load system 850 operatively connected to the chamber 810 for loading and unloading wafers into and out of the processing chamber. The load system 850 typically is automated to load and unload the wafers into the chamber at a controlled rate, for example. The system further may include a display 852 operatively coupled to a control system 854 for displaying a representation (e.g., graphical and/or textual) of one or more process conditions. In accordance with one or more aspects of the present invention, the thickness or amount of material 811 remaining at an etching location on the wafer 814 or other sensed operating conditions can, for example, be presented on the display 852.

A power supply 856 is also included to provide operating power to components of the system. Any suitable power supply (e.g., battery, line power) may be implemented with the present invention.

A measurement system 870 is optically coupled with one or more waveguides 872a thru 872n (collectively referred to as 872, n being a positive integer) to form a monitoring system according to an aspect of the present invention. The waveguides 872 are integral with the wafer 814 to measure operating condition as discussed above with respect to FIGS. 3A–3F, 4, 5 and 6 (e.g., via interferometric techniques). More particularly, the measurement system includes one or more sources of light that provide light to the respective waveguides 872. The light can be at different wavelengths to enable monitoring different operating conditions indicative of process characteristics, for example. The measurement system monitors (e.g., through interferometric techniques) light characteristics associated with each of the waveguides 872 during processing within the chamber, which characteristics can be utilized to measure the thickness of material 811 at various locations on the wafer 814 as the material is selectively etched or stripped away, such as through surface light loss. In the example illustrated, the waveguides 872 are oriented generally perpendicular to the surface of the substrate. It is to be appreciated that, for purposes of the present invention, any number of the waveguides may be arranged in any number of schemes (e.g., linear, grid, circular, random arrangements) to provide information from various locations throughout wafer 814 (e.g., from locations where etching is occurring as well as from locations where etching is not supposed to occur to ensure that material 811 is not inadvertently removed from that portion of the wafer). It is to be further appreciated that the waveguides and measurement system may also be employed in a test wafer in establishing and setting operating parameters for a fabrication system. Information obtained by the measurement system is provided to the control system 854.

In the example illustrated, one or more other sensors 880 are also included to monitor and/or measure selected processing conditions within the chamber 810. The other sensors 880 may include, for example, a temperature sensor, a pressure sensor, etc. The various other sensors 880 can provide respective signals to the control system 854 regarding the measured parameters. The control system 854 can in turn analyze the conditions indicated by the received signals, including those from the measurement system 870, to discern whether the fabrication process is proceeding as intended.

The control system 854 can utilize the measured conditions to control operating characteristics associated with the process by providing appropriate control signals to the associated systems (e.g., etching system 832, temperature system 842, pressure system 844). Such control signals may selectively adjust respective operating parameters of the systems to achieve a desired result. For example, where material is being removed from the wafer too quickly or at unintended locations, a control signal from the control system 854 can cause the etching system 832 to adjust the amount or locale of etchants applied during the process.

By way of example, the control system 854 includes a processor 886, such as a microprocessor or CPU, coupled to a memory 888. The processor 886 receives measured data from the measuring system 870 and corresponding other data from the other sensors 880. The processor 886 may also be operatively coupled to the etching system 832, the temperature system 842 and/or the pressure system 844. The control system 854, and more particularly the processor 886, may be programmed/and or configured in any suitable manner to control and operate the various components within the system in order to carry out the various functions described herein.

The processor 886 may be any of a plurality of processors. The manner in which the processor 886 can be programmed to carry out the functions relating to the present invention will be readily apparent to those having ordinary skill in the art based on the description provided herein.

The memory 888 serves to store, among other things, program code that may be executed by the processor 886 for carrying out operating functions of the system as described herein. The memory 888 may include read only memory (ROM) and random access memory (RAM). The ROM contains among other code the Basic Input-Output System (BIOS) which controls the basic hardware operations of the system. The RAM is the main memory into which the operating system and application programs are loaded. The memory 888 also serves as a storage medium for temporarily storing information such as target values, coordinate tables, patterns against which observed data can be compared, and algorithms that may be employed in carrying out one or more aspects of the present invention, for example. For mass data storage, the memory 888 may further include a hard disk drive.

As such, the memory 888 may store control information such as the control architecture, controller gains, or control transfer functions. It may also store processing parameters such as "recipe" information that prescribes target process parameters and allowable process operating limits required to product acceptable products (e.g., amount of material removal and material removal rate). Also the memory 888 may also function as a data store serving, for example, as a signal (signature) library that can be populated with an abundance of signatures against which one or more measurements can be compared. Entries in the data store can be stored with respective operating parameters under which they were obtained (e.g., temperature, pressure, gas distribution volume/rate) and relations can be formed to facilitate correlating process parameters. One or more measured etching rate values can be compared, for example, to one or more entries within the data store (e.g., by direct matching, interpolation or otherwise) to generate feed forward/backward control data to control one or more operating parameters of one or more the fabrication processing components to achieve a desired result.

Signatures can be obtained manually to populate the data store by observing the operating conditions generated during a training session, for example. Alternatively, or in addition to manually observing values, simulation, modeling and/or artificial intelligence techniques can be employed to populate the data store with signatures against which measured values can be compared.

It is to be appreciated that such a data store can store data in data structures including, but not limited to one or more lists, arrays, tables, databases, stacks, heaps, linked lists and data cubes. Furthermore, the data store can reside on one physical device and/or may be distributed between two or more physical devices (e.g., disk drives, tape drives, memory units). The memory 888 thus can correlate stored signatures with sensed information (e.g., with other process parameters). The control system 854 may be employed to update the stored signatures in the memory 888 (e.g., via the measurement system 870, other sensors 880). Alternatively, the measurement system 870 and sensors 880 can be coupled directly to the memory 888 to populate the data store, such as during a data gathering or learning mode.

As a result, the system 800 provides for monitoring and selectively controlling components of the fabrication process. Monitored conditions provide data based on which the control system 854 may implement feedback/feed forward process control, alone or in combination with other stored data, so as to form a semiconductor and/or MEMS device having desired physical features (e.g., layer thickness and/or uniformity) and functional characteristics (e.g., breakdown voltage, and/or resistivity, and/or signal coupling).

Figure 9:
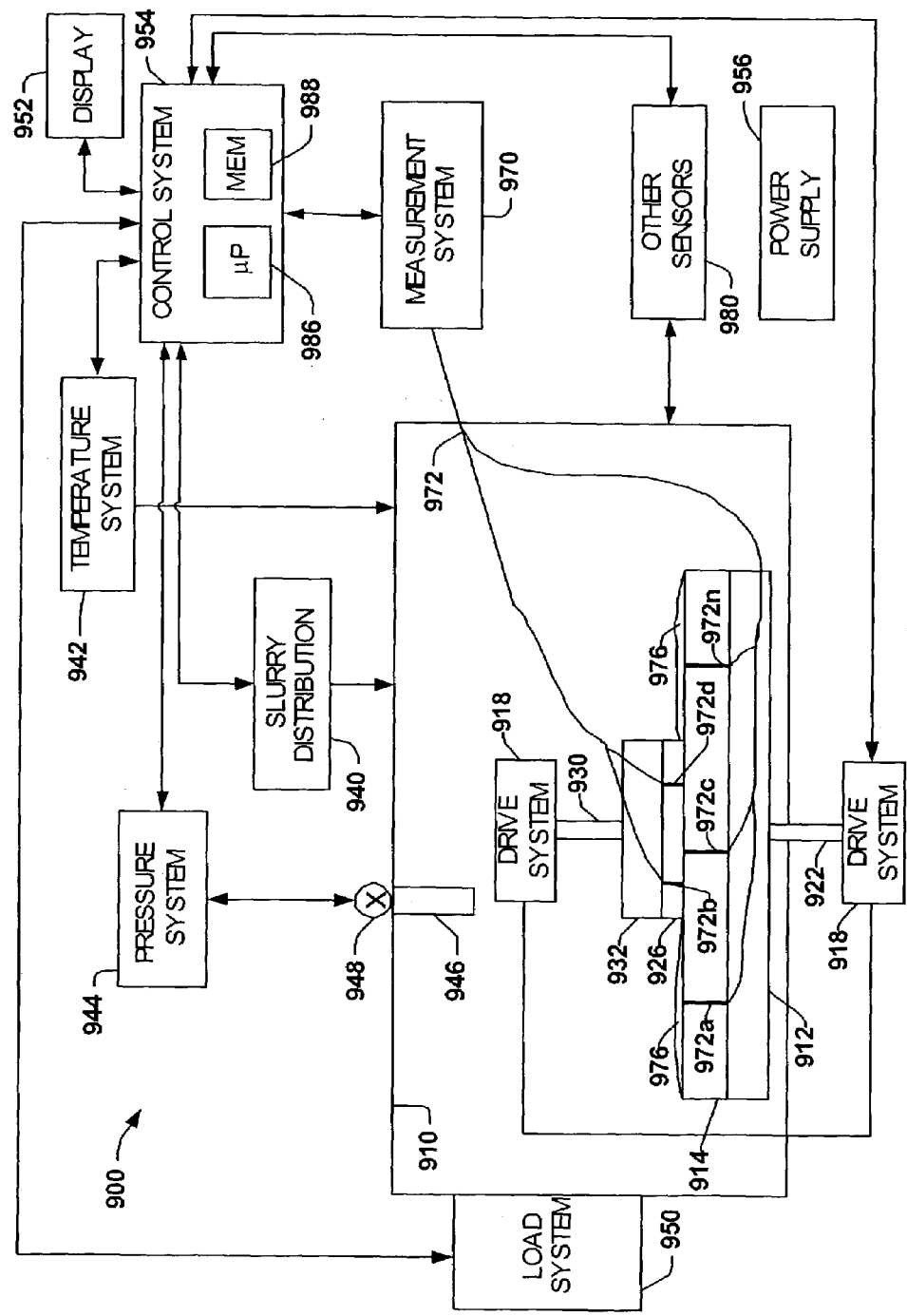
FIG. 9 is a schematic diagram illustrating a chemical mechanical polishing stage in a semiconductor and/or MEMS fabrication system having a control system situated therein according to one or more aspects of the present invention.

Turning to FIG. 9, a fabrication system 900 for a semiconductor and/or MEMS device having a control system situated therein according to one or more aspects of the present invention is illustrated. In particular, the system illustrated facilitates a chemical mechanical polishing CMP stage of a fabrication process. The fabrication system 900 includes a process chamber 910 having a support, such as may include a stage 912 (or chuck) operative to support (e.g., via vacuum) a substrate, such as a wafer 914.

A drive system 918 is operatively connected to the wafer 914 to effect selective movement of the wafer surface within the chamber 910. The drive system 918 is connected to the wafer by way of a spindle 922 which is itself connected to the support 912. The drive system 918 is also operatively coupled to a polishing pad 926 for polishing the wafer 914 and/or one or more layers developed thereon. The drive system 918 is connected to the polishing pad by way of a spindle 930 and a platen 932. The drive system 918 includes, for example, one or more motors (not shown) utilized to establish relative movement (orbital or otherwise) between the pad 926 and wafer 914. The pressure and degree of contact between the pad and wafer may thereby be controlled by controlling the relative motion of the pad and wafer.

A slurry distribution system 940 is included to selectively distribute various amounts of slurry 976 having different degrees of abrasiveness onto various locations on the wafer 914 and/or pad 926 to assist with CMP.

A temperature system 942 also is provided for selectively regulating the temperature within the chamber 910. For example, the system 942 may be a diffusion type system (e.g., a horizontal or vertical furnace) operable to diffuse heat into the chamber 910. The temperature system 942 may implement its own temperature control process or such control may be implemented as part of other sensors operatively associated with the chamber 910.

Similarly, a pressure system 944 may be included to selectively regulate the pressure within the chamber. The pressure system 944 may include, for example, one or more vent conduits 946 having valves 948 that may be selectively adjusted to be opened and/or closed to varying degrees to assist with regulating the pressure within the processing chamber 910. Alternatively or additionally, the pressure system 944 can include a source of clean pressurized air coupled to the chamber 910 to maintain a desired pressure in the chamber.

The system 900 may also include a load system 950 operatively connected to the processing chamber 910 for loading and unloading wafers into and out of the chamber. The load system 950 typically is automated to load and unload the wafers into the chamber at a controlled rate, for example. The system further may include a display 952 operatively coupled to a control system 954 for displaying a representation (e.g., graphical and/or textual) of one or more process conditions. In accordance with an aspect of the present invention, the thickness, uniformity, degree of wear and/or rate of wear of one or more surfaces processed, as described above with respect to FIGS. 3A–3F, 4 and 5, may, for example, be presented on the display 952.

A power supply 956 is also included to provide operating power to components of the system. Any suitable power supply (e.g., battery, line power) may be implemented with the present invention.

A measurement system 970 is optically coupled with one or more waveguides 972A thru 972N (collectively referred to as 972, N being a positive integer) to form a monitoring system according to an aspect of the present invention. The waveguides 972 are integral with the wafer 914 and/or polishing pad 926 to measure operating conditions as discussed above with respect to FIGS. 3A–3F, 4, 5 and 6 (e.g., via interferometric techniques). More particularly, the measurement system includes one or more sources of light that provide light to the respective waveguides 972. The light can be at different wavelengths to enable monitoring different operating conditions indicative of process characteristics, for example. The measurement system monitors (e.g., through interferometric techniques) light characteristics associated with each of the waveguides 972 during processing within the chamber, which characteristics can be utilized to measure the thickness of polishing pad 926 and/or one or more layers (not shown) formed on the wafer 914, such as through surface light loss. The waveguides 972 are oriented generally perpendicular to the surface of the substrate 914 and pad 926 so as to wear at one end and experience a change in length as processing occurs. It is, however, to be appreciated that the waveguides 972 may be arranged in any number of schemes (e.g., linear, grid, circular, random arrangements) to provide wear information at various locations throughout wafer 914 and/or polishing pad 926. It is to be further appreciated that the waveguides and measurement system may also be employed in a test wafer in establishing and setting operating parameters for a fabrication system. Information obtained by the measurement system is provided to the control system 954. The fiber embedded in the wafer substrate 914 may be configured to also detect localized temperature, pressure, or other contaminants. Coatings or doping material may be applied to the fiber that change the optical characteristics of the fiber (e.g., index of refraction) may be employed and/or gratings may be applied to the fiber to change the characteristics of reflected light. These fiber modifications will cause a change in the characteristic optical signal reflected back from the fiber permitting measurement of temperature, pressure, and/or specific contaminants to be measured in addition to accurate material removal and material removal rate information (e.g., via interferometric techniques). Additionally, some light sent down the fiber will exit the end of the fiber and be reflected from material (e.g., slurry 976). The reflected light energy will re-enter the fiber and be detected along with light that never left the waveguide. The reflected light from the slurry can be segregated from other reflected light and the reflectance of the slurry identified. The reflectance of the slurry can indicate the absence of slurry or if contaminants are present or if the slurry is "loaded" with removed material or if other problems exist with the slurry or machining process.

In the example illustrated, one or more other sensors 980 are also included to monitor and/or measure selected processing conditions within the chamber 910. The other sensors 980 may include, for example, a temperature sensor, mass flow sensor for slurry, a pressure sensor, etc. The various other sensors 980 can provide respective signals to the control system 954 regarding the measured parameters. The control system 954 can in turn analyze the conditions indicated by the received signals, including those from the measurement system 970, to discern whether the fabrication process is proceeding as intended.

The control system 954 can control operating characteristics associated with the process by providing appropriate control signals to the associated systems (e.g., slurry distribution system 940, drive system 918, temperature system 942, pressure system 944). Such control signals may selectively adjust respective operating parameters of the systems to achieve a desired result. For example, where the pressure between the polishing pad and wafer is insufficient to effect a desired rate of wear, a control signal from the control system 954 can cause the drive system 918 to more forceably urge the pad 926 and wafer 914 into contact with one another. Additionally or alternatively, additional slurry can selectively dispensed onto the wafer and/or the pad and wafer can be rotated faster relative to one another to increase the rate of wear.

By way of example, the control system 954 includes a processor 986, such as a microprocessor or CPU, coupled to a memory 988. The processor 986 receives measured data from the measuring system 970 and corresponding other data from the other sensors 980. The processor 986 may also be operatively coupled to the drive system 918, the slurry distribution system 940, the temperature system 942, the pressure system 944 and/or the load system 950. The control system 954, and more particularly the processor 986, may be programmed/and or configured in any suitable manner to control and operate the various components within the system in order to carry out the various functions described herein.

The processor 986 may be any of a plurality of processors. The manner in which the processor 986 can be programmed to carry out the functions relating to the present invention will be readily apparent to those having ordinary skill in the art based on the description provided herein.

The memory 988 serves to store, among other things, program code that may be executed by the processor 986 for carrying out operating functions of the system as described herein. The memory 988 may include read only memory (ROM) and random access memory (RAM). The ROM contains among other code the Basic Input-Output System (BIOS) which controls the basic hardware operations of the system. The RAM is the main memory into which the operating system and application programs are loaded. The memory 988 also serves as a storage medium for temporarily storing information such as target values, coordinate tables, patterns against which observed data can be compared, and algorithms that may be employed in carrying out one or more aspects of the present invention, for example. For mass data storage, the memory 988 may further include a hard disk drive.

As such, the memory 988 may also function as a data store serving, for example, as a signal (signature) library that can be populated with an abundance of signatures against which one or more measurements can be compared. Entries in the data store can be stored with respective operating parameters under which they were obtained (e.g., temperature, pressure, slurry distribution volume/rate) and relations can be formed to facilitate correlating process parameters. One or more measured wear rate values can be compared, for example, to one or more entries within the data store (e.g., by direct matching, interpolation or otherwise) to generate feed forward/backward control data to control one or more operating parameters of one or more the fabrication processing components to achieve a desired result.

For example, the rate, volume and/or degree of abrasiveness of slurry 976 distributed onto the wafer may be selectively adjusted to achieve a desired level of uniformity. Signatures can be obtained manually to populate the data store by observing the operating conditions generated during a training session, for example. Alternatively, or in addition to manually observing values, simulation, modeling and/or artificial intelligence techniques can be employed to populate the data store with signatures against which measured values can be compared.

It is to be appreciated that such a data store can store data in data structures including, but not limited to one or more lists, arrays, tables, databases, stacks, heaps, linked lists and data cubes. Furthermore, the data store can reside on one physical device and/or may be distributed between two or more physical devices (e.g., disk drives, tape drives, memory units). The memory 988 thus can correlate stored signatures with sensed information (e.g., with other process parameters). The control system 954 may be employed to update the stored signatures in the memory 988 (e.g., via the measurement system 970, other sensors 980). Alternatively, the measurement system 970 and sensors can be coupled directly to the memory 988 to populate the data store, such as during a data gathering or learning mode.

As a result, the system 900 provides for monitoring and selectively controlling components of the fabrication process. Monitored conditions provide data based on which the control system 954 may implement feedback/feed forward process control, alone or in combination with other stored data, so as to form a semiconductor and/or MEMS device having desired features (e.g., layer thickness and/or uniformity).

Figure 10:
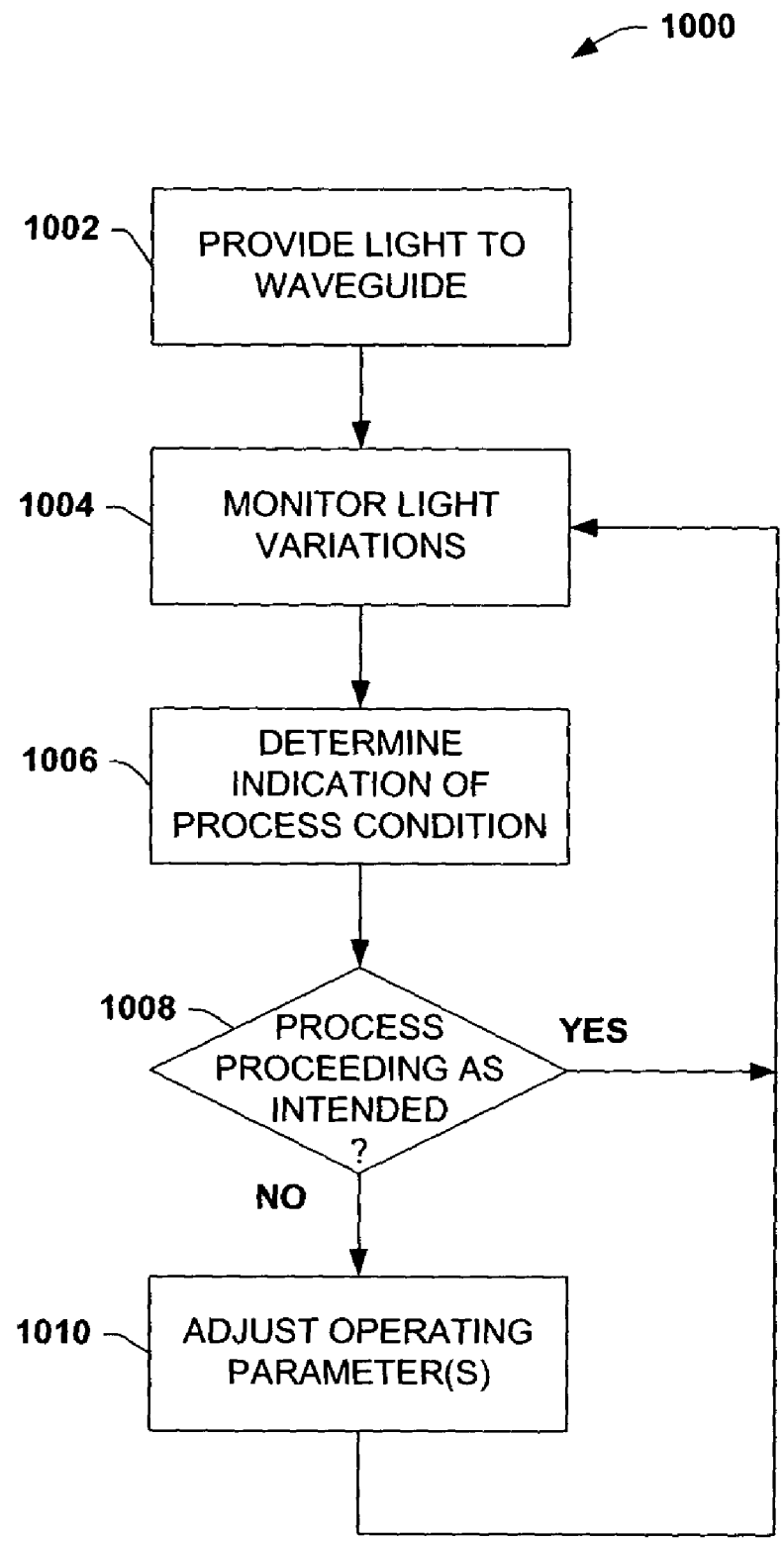
FIG. 10 is a block diagram illustrating a methodology for monitoring and controlling a process associated with a substrate in accordance with one or more aspects of the present invention.

In view of the exemplary systems shown and described above, a methodology that may be implemented in accordance with the present invention will be better appreciated with reference to the flow chart of FIG. 10. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

Turning to FIG. 10, a methodology 1000 for monitoring at least one condition of a process associated with a substrate and utilizing the at least one condition to control the process is illustrated. The methodology begins at 1002 wherein light from a light source is provided to a first end of a waveguide at least partially formed within the substrate (e.g., via dopants added to the substrate, an optical fiber inserted into hole in the substrate). Then, at 1004 variations in the light (e.g., due to reflections or interference occurring at a second end of the waveguide located near a surface of the substrate) are monitored (e.g., at the first end of the waveguide). At 1006, an indication is ascertained (e.g., by interferometric or other means) of the at least one condition of the process associated with the substrate. At 1008, the indication is examined to determine whether the process is proceeding as intended. If not, the methodology advances to 1010 wherein one or more operating parameters of the process are adjusted in response to the indication. After 1010, the methodology loops back to 1004 to once again monitor light variations. Similarly, if it is determined at 1008 that the process is proceeding as intended the process loops back to 1004 to monitor light variations.

It can be appreciated that one or more aspects of the present invention can also have application to other areas, several of which are mentioned below. In the following examples, interferometric operations are discussed in greater detail. It is to be appreciated that in the foregoing discussions are intended to include these, as well as other, operations as relates to detecting, monitoring and controlling wear of an article, where the article can include, for example, a substrate and/or MEMS device.

In FIG. 11, a schematic diagram depicts an article 20 having an optical fiber 22 embedded therein. The fiber is operatively coupled to an interferometric system 40. The article can be, for example, a substrate, a MEMS device and/or a carbon brush. Carbon brushes are normally composed of a carbon based matrix. There are a variety of brush compounds for a variety of applications. There are five basic categories of brushes: carbon, carbon-graphite, electrographite, graphite, and metal-graphite. The term "carbon" has a broad meaning that refers to any brush having any quantity of carbon in it regardless of the quantity of other materials. The term also has a narrower meaning to refer to a brush predominantly composed of amorphous carbon such as petroleum coke. Carbon-graphite refers to a brush composed of a mixture of carbon (as defined above) and graphite. Electrographite refers to a brush composed of carbon subjected to intense heat in an electric furnace that graphitizes the carbonaceous binder. Graphite refers to a brush that is predominantly graphite mined from the ground or manufactured in an electric furnace. Metal-graphite refers to graphite brushes having a quantity of metal such as silver or copper.

It is to be appreciated that any type of brush suitable for carrying out the present invention may be employed and falls within the scope of the present invention. Such brushes have widescale application in DC motors, generators, and slip rings to name a few. Furthermore, it is to be understood that the present invention is not limited to application in brushes. Rather, the present invention may be employed in conjunction with almost any type of article or device that is prone to wear. Moreover, although only one optical fiber 22 is shown embedded in the article 20, it is to be appreciated that more than one optical fiber 22 may be embedded in the article 20 to obtain wear and rate of wear data relating to different parts of the article 20.

The interferometric system 40 is employed in determining the reduction in length of the optical fiber 22 which in turn represents the amount of wear of the carbon brush 20. One specific aspect of the present invention employs a Michelson-type interferometer. In this kind of interferometer, a light beam 52 from a coherent light source 42 such as a laser is split into two beams using a beam splitter, one of which can be referred to as a reference light beam 54 and the other as a measuring light beam 56. A semireflective mirror 60 is disposed in the path of the light beam 52 at an angle of 45□ and is used as the beam splitter. A cube formed by cementing two prisms together may also be used as the beam splitter 60, where the cemented surface is disposed in the beam path at a 45° angle.

When the light beam 52 from the light source 42 (e.g., laser) reaches the beam splitter 60, the light beam 52 is split into the reference beam 54 and the measuring beam 56. The reference beam 54 is reflected toward a mirror 62 where it is reflected back toward the beam splitter 60. The measuring beam passes through the beam splitter 60 towards a focus lens 64. The focus lens 64 focuses the measuring beam 56 to enter a free end of the optical fiber 22. The measuring beam 56 travels through the optical fiber 22 toward the portion of which is embedded in the brush 20. The measuring beam 56 is incident on an interface between the end of the optical fiber 22 and the commutator surface. The commutator surface, typically being reflective, causes the measuring beam 56 to be reflected back away from the interface towards the beam splitter 60 through the same optical fiber 22. The reflected reference beam 54 and reflected measuring beam 56 are combined by the beam splitter 60 to form an interference beam 68 which is directed toward optical detector 70 wherein different wavelengths are essentially used to monitor certain conditions or characteristics.

Depending on the phasing of the two beams 54, 56 with respect to one another, the interference beam 68 can assume an amplitude between the sum of the individual amplitudes of the two beams 54, 56 (constructive interference) and zero (destructive interference). When the two beams 54, 56 are 180° out of phase (i.e., destructive interference), a completely dark fringe results. When the two beams 54, 56 are in phase, a bright fringe results. The light being preferably of laser form is a standing wave pattern. Accordingly, each fringe (e.g., dark fringe or portion thereof) as detected by a detector 70 corresponds to a reduction in the length of the optical fiber 22 of ½λ (i.e., ½ the wavelength of the light source 42).

Thus, by counting the number of fringe changes observed on the output of the detector 70, the reduction in the length of the optical fiber 22 can be determined with great precision since the source beam 52 is typically of high frequency and short wavelength (2). For instance, if the reference beam is from a laser diode having an emission wavelength of 800 mn, one dark fringe represents a reduction in length of the optical fiber 22 of 400 nm. In addition, the signal from detector 70 typically provides grayscale information rather than just binary information indicating bright fringe (1) or dark fringe (0). As a result, the range of intensity values provided by detector 70 allows processor 50 to determine intermediate fringe values. Through well known techniques such as interpolation, the processor may readily determine fringe intensity values such as 70% dark fringe. Intermediate fringe values can easily be determined up to 1/10 the range of bright-dark intensity values. This permits determining the change in length of optical fiber 22 and carbon brush 20 by 1/10 of 400 nm if an 800 nm light source is used. In this example, the change in brush length of 40 nm can be readily detected. The reduction in length of the fiber optic cable 22 by 400 nm equates to a corresponding reduction in length of the carbon brush 20 by 400 nm. Since the carbon brush 20 is substantially hard in composition and may take many months for it to wear only 1 inch, determining the amount of wear at such a micro-level (e.g., in nanometers) is useful.

Furthermore, since the amount of wear can be determined at the micro-level, the present invention provides for the prompt determination of the rate of wear of the carbon brush 20. More particularly, by monitoring the amount of wear of the carbon brush 20 over time a determination as to the rate of wear of the carbon brush 20 can be made. Such monitoring can be made by a processor 80 (FIG. 11A) employing a clock (not shown). As a result of determining the rate of wear, the processor 80 can forecast when the carbon brush 20 will need to be replaced. Precise amount of wear information enables precise rate of wear information to be determined in a very short time. Early indication of wear problems are provided in hours or days rather than weeks or months. This permits early identification of the cause of wear problems and fault correction before brushes wear excessively or machinery damage occurs. It is also possible to correlate abnormal wear problems directly with operational and environmental changes. Accordingly, the present invention affords for scheduled maintenance of articles prone to wear which greatly facilitates maximizing article usage and minimizes process down time. In other words, if the rate of wear of the article was not determinable a user could not forecast an optimal time for replacement of the article. Rather, the user would simply shutdown the process using the article when the amount of wear reached a predetermined level. Typically, machinery is periodically shut down, disassembled, and brushes inspected. The brushes will often be replaced with substantial remaining useful life in order to avoid the risk of unexpected failure and machinery damage. In DC brush-type motors, the brushes are the highest maintenance, most failure prone component. On the other hand, the present invention affords for relatively long-term forecasting of when to replace an article. This aspect of the present invention facilitates process efficiency since shutdowns can be planned in advance.

Figure 11A:
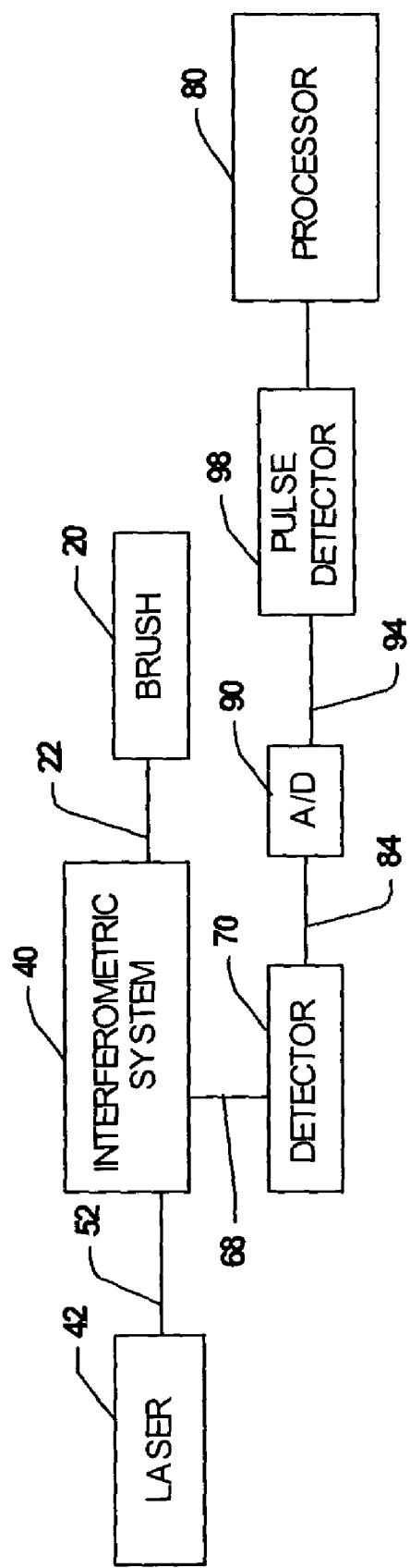
FIG. 11A is a schematic block diagram of one specific system for determining the amount of wear of an article in accordance with the present invention.

FIG. 11A is a schematic block diagram of one specific system for determining the amount of wear of an article in accordance with the present invention. A source of monochromatic light such as a laser 42 provides light to optical fiber 22 of the interferometric system 40. Preferably, the laser 42 is a frequency stabilized laser however it will be appreciated that any laser or other light source (e.g., laser diode or helium neon (HeNe) gas laser) suitable for carrying out the present invention may be employed. The laser 42 outputs a laser beam 52 which is supplied to the optical fiber 22 of the interferometric system. The interferometric system 40 operates in the manner described above to split the beam 52 into two beams (reference light beam 54 and measuring light beam 56). As mentioned above, after traveling over independent paths, the measuring beam 56 and reference beam 54 are recombined to form an interference beam 68.

The interference beam 68 is supplied to detector 70 which converts the interference beam 68 into an electric signal which is a signal having a magnitude and frequency corresponding to a standing wave pattern or fringe pattern of the interference beam 68. As noted above, depending on the phasing of the two beams 54, 56 with respect to one another, the interference beam 68 can assume an amplitude anywhere between the sum of the individual amplitudes (constructive interference) and the difference of the individual amplitudes (destructive interference). When the two beams 54, 56 are 180° out of phase (i.e., destructive interference), a completely dark fringe results. When the two beams 54, 56 are in phase, a bright fringe results.

The detector 70 is preferably a photodetector or the like which outputs an electrical signal the amplitude of which is indicative of the intensity of light received by the detector 70. The electric signal output by the detector 70 is an analog signal which travels along line 84 and is input to analog-to-digital (A/D) converter 90 which digitizes the analog signal for ease of processing. The digital signal output by the A/D converter 90 is input via line 94 to a pulse detector 98. Each dark fringe (or portion thereof) appears as a zero ("0") or low signal in digital form. Each fringe change that results as the interference beam 68 is passed through the detector 70 corresponds to a reduction in the length of the fiber optic cable 22 of ½λ (i.e., ½ the wavelength of the reference beam 54). The pulse detector 98 monitors the change in fringes and counts each fringe that cycles therethrough. It will be appreciated that any suitable method for determining the number of fringes may be employed to carry out the present invention and falls within the scope of the claims.

The number of fringes counted by the pulse detector 98 is input to processor 80. The processor 80 is programmed to control and operate the various components within the present invention in order to carry out the various functions described herein. The processor or CPU 80 can be any of a plurality of processors either operating singularly or in combination. The manner in which the processor 80 can be programmed to carry out the functions relating to the present invention will be readily apparent to those having ordinary skill in the art based on the description provided herein. The processor 80 counts the number of fringes with respect to a reference fringe starting count. By the number of fringes that have been counted, the processor 80 can readily determine the reduction in length of the optical fiber 22 with great precision since the reference beam 54 is typically of high frequency. In turn, by determining the reduction in the optical fiber 22, the amount of wear of the carbon brush 20 (i.e., article) is determined as well. The rate of wear can be determined via Δfringe count/time.

It is also possible to determine intermediate fringe values and determine brush wear and rate of wear more accurately than just counting fringes as described above. This is accomplished by utilizing an interpolation module 98A (in FIG. 11B) to analyze the interference pattern 94. Intermediate fringes which relate to the degree of interference between the reference beam and measurement beam may be determined and passed to processor 80. Processor 80 may then establish precisely the wear and rate of wear of brush 20 by at least 1/10 the wavelength of light used.

Figure 11B:
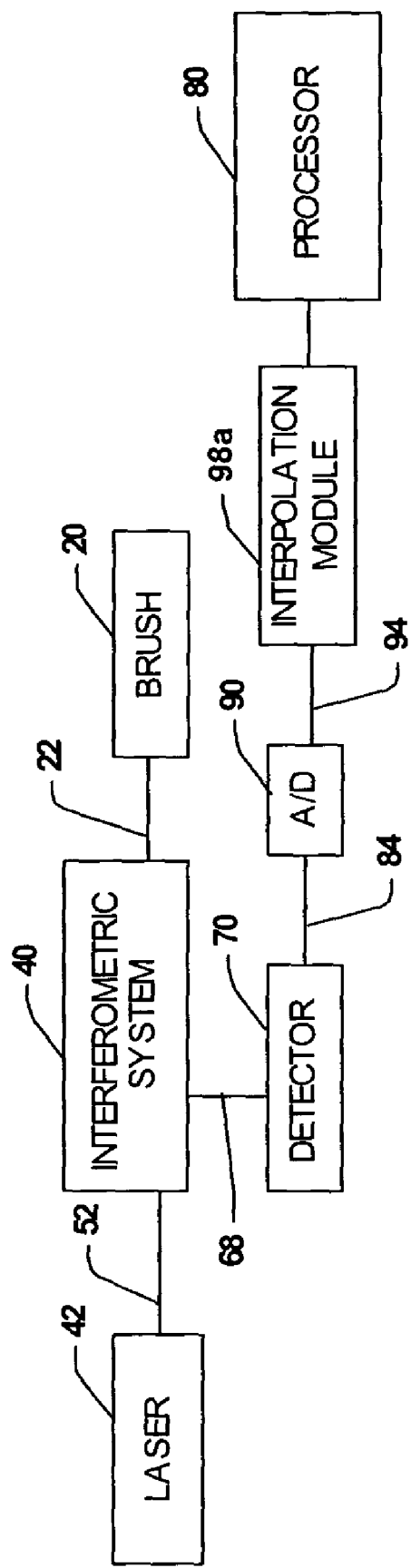
FIG. 11B is a schematic block diagram of an alternate system for determining the amount of wear of an article in accordance with the present invention.
Figure 11C:
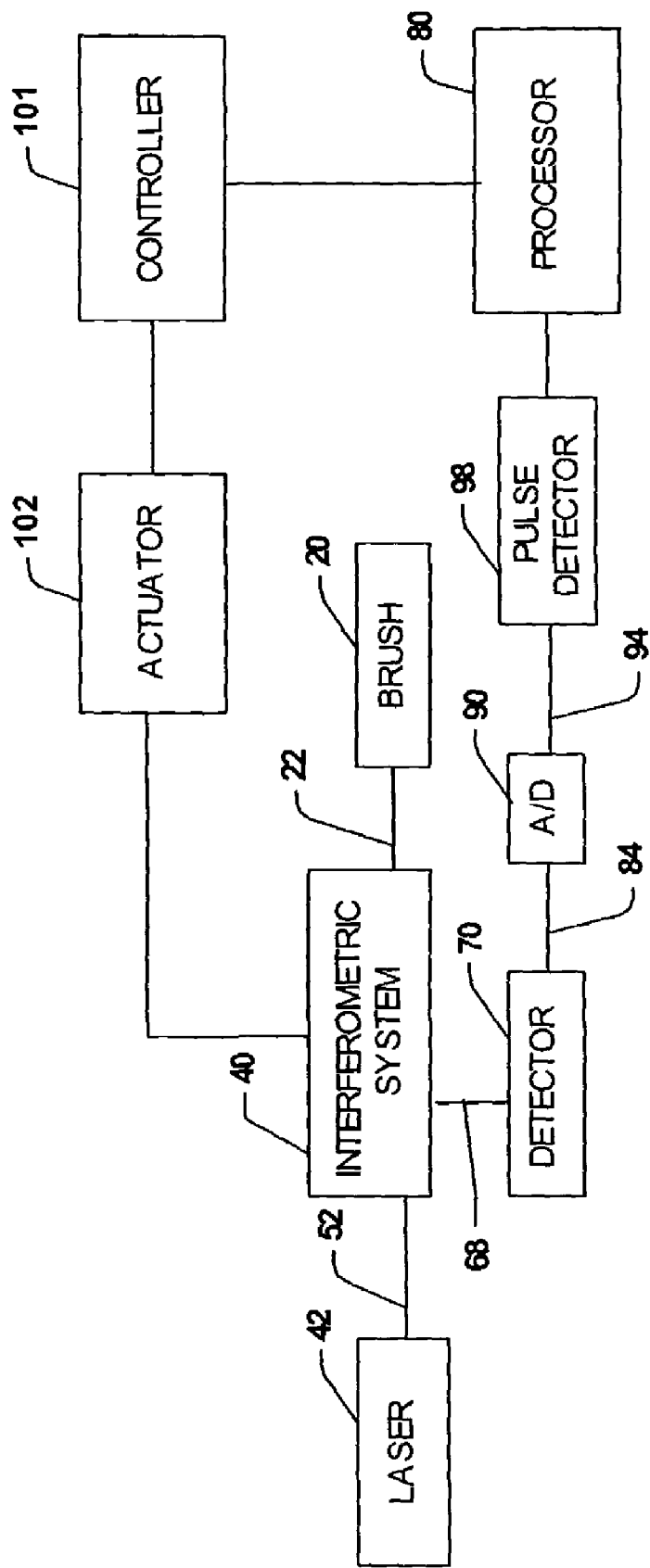
FIG. 11C is a schematic block diagram of yet another alternate system for determining the amount of wear of an article in accordance with the present invention.

An alternative method for implementing the interferometric system is shown in FIG. 11C. Rather than counting or interpolating fringes as previously described, an actuator 102 is coupled to a controller 101. A control signal is output from processor 80 whenever the observed fringe changes intensity. The amount of control action requested my be proportional to the amount of fringe intensity change observed (as in PID controllers) and the direct of control requested is prescribed to return the observed fringe back to it's original intensity level. The controller 101 takes the commanded change and outputs an appropriate electrical signal, usually a voltage or voltage pulse train to the actuator 102. The actuator 102 is designed to laterally translate the reflective surface 62 receiving the reference beam 54 closer or further from the beam splitter 60. The end result from this closed loop system is that the observed fringe by detector the 70 remains relatively stationary. An amount of displacement of reflective surface 62 required to maintain a stationary fringe pattern directly corresponds to the amount of fiber wear 22 and brush wear 20. A variety of actuators may be used to laterally translate the reflective surface movement such as precision lead screw devices, piezo-electric actuators, and MEMs devices such as a lateral resonator/translator (developed at Case Western Reserve University) or the Scratch Drive Actuator-SDA (developed at UCLA) are candidate actuators.

Figure 12:
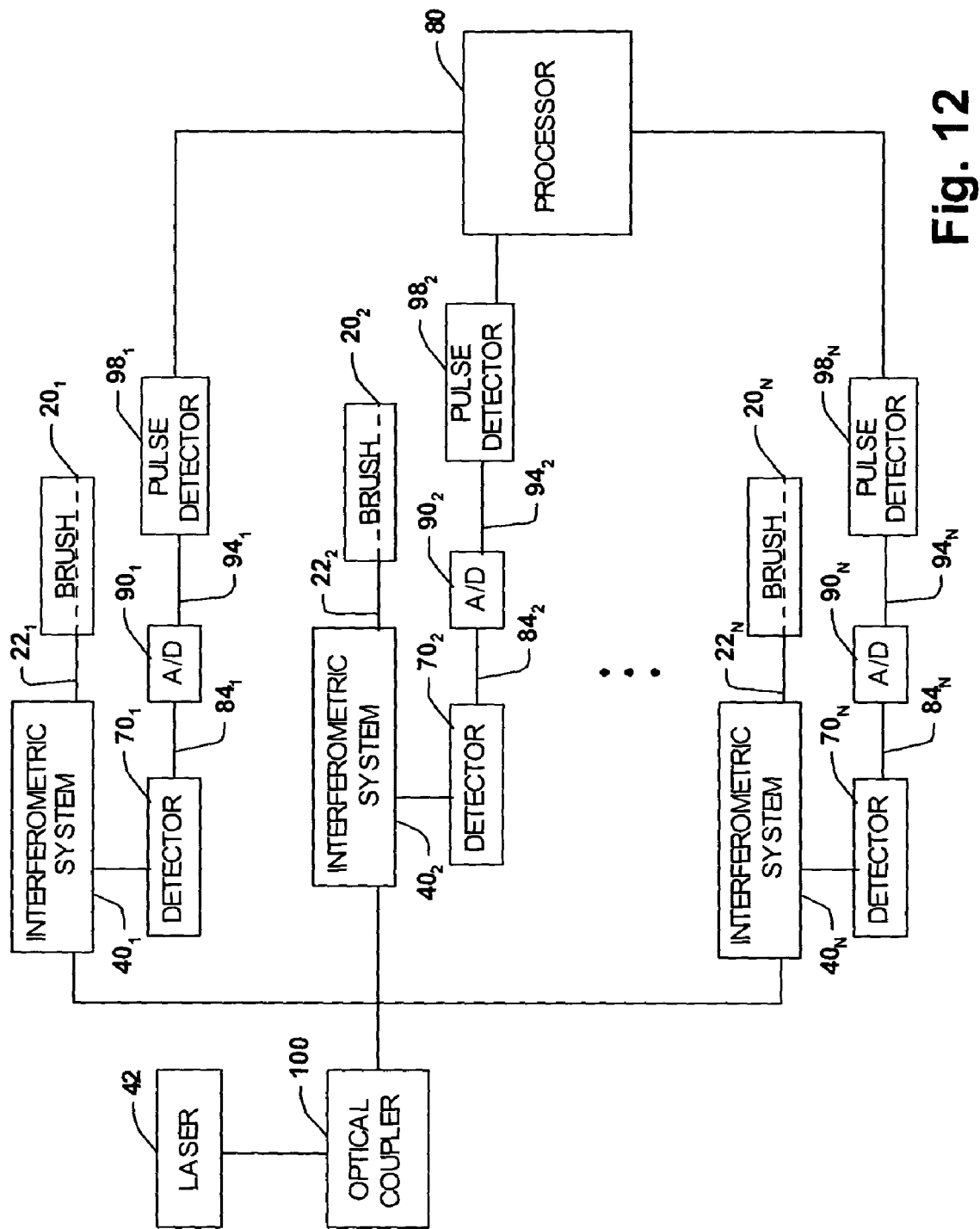
FIG. 12 is a schematic block diagram of another specific aspect of the present invention which provides for the determination of the amount of wear and rate of wear for multiple articles in accordance with the present invention.

FIG. 12 is a schematic block diagram of another specific aspect of the present invention. This embodiment provides for the determination of the amount of wear and rate of wear for multiple articles 20. Oftentimes, in DC motor applications more than one brush is employed to provide current to the motor. The number of brushes used corresponds to the number of poles of the motor. Thus, for example, a six-pole motor would have six brushes. In this embodiment, a plurality of interferometric systems 40 similar to that of FIG. 11A are employed. According to this aspect of the present invention, the amount of wear and rate of wear of N number of articles (i.e., brushes 20) can be determined. Like reference numerals indicate like parts with respect to FIG. 11A and thus further description of these components is not presented for sake of brevity. In order to provide light to the plurality of interferometric systems 40, the laser 42 is operatively connected to an optical coupler 100. The optical coupler 100 couples or splits the laser beam delivered by the laser 42 into multiple outgoing beams for use in the respective interferometric systems 40. The beam emitted from laser 42 is collimated and split into multiple beam portions for introduction into the respective multiple outgoing optical fibers 22. Each split beam portion is introduced into its respective interferometric system 40 in accordance with specific beam introduction criteria.

The present embodiment maximizes the utilization of the laser 42. Frequency stabilized lasers are relatively expensive at the present time and thus maximizing use of the laser 42 is desirable. In broadest terms, this requires making the laser generated beam available to as many functions as possible. A second design objective synergistic with the objective of maximizing laser utilization is to maximize the system's flexibility to deliver the laser beam to the multiple, spatially located brushes 20 which surround the commutator 30. Thus, this specific embodiment of the present invention provides for increased flexibility by splitting the laser beam and delivering the split beam portions through different multiple optical fibers 22 each of which are embedded in different brushes 20.

Each pulse counter 98 of the respective interferometric systems 40 counts the number of digital low signals which correspond to fringes that are cycled through the respective detectors 70 and provides that count to the processor 80. Accordingly, the processor 80 can determine the degree of wear and the rate of wear of each brush 20. It is to be appreciated that the processor 80 may employ any suitable technique (e.g., multi-channel, encoding, multiplexing, etc.) for distinguishing the respective data output by the various pulse detectors 98. It will be appreciated that multi-element detectors 70 and/or a multiplexed A/D 90 could be employed to further consolidate the present embodiment.

It may also be appreciated that the pulse detector 98 may be replaced with corresponding interpolation modules (as shown in FIG. 11B). Alternatively, the system of FIG. 12 can employ a single source, interferometric system, detector and processor by optically switching among the various fibers 22 embedded in brushes to be monitored. An optical switch (not shown) of the type generally known such as mechanically movable reflectors such as prismatic devices or of the electro-optic type such as Lithium Niobate. Either of these techniques will be feasible since we do not need to measure multiple brushes concurrently and the switching time to index to successive brushes is not critical. This latter design provides maximum re-usability of all system components except the brushes and their embedded fiber which must be kept separate.

Figure 13A:
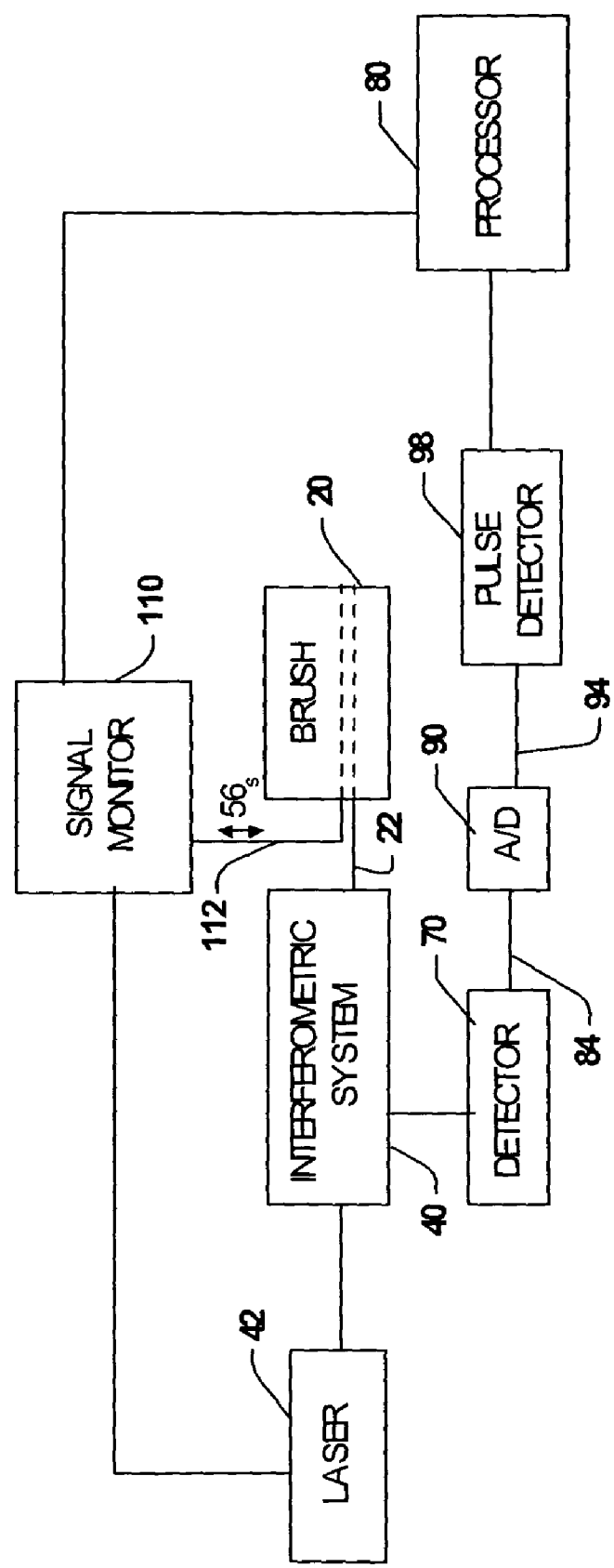
FIG. 13A is a schematic block diagram of another specific aspect of the present invention which affords for surface assessment in accordance with the present invention.

FIG. 13A is a schematic block diagram of another specific aspect of the present invention. This embodiment is similar to that of FIG. 11A but further includes a signal monitor (SM) 110. The SM 110 is operatively coupled to an optical fiber 112, laser 42 and the processor 80. The SM provides for directing a measuring beam $56_s$ from the laser 42 to the optical fiber 112. The measuring beam $56_s$ travels through the optical fiber, at least a portion of which is embedded in an article such as brush 20. The measuring beam $56_s$ will strike an object that the article 20 is in contact with and be reflected back through the optical fiber 112. The SM 110 receives the reflected measuring beam 56. The SM 110 converts the reflected measuring beam $56_s$ to an electrical signal and filters the signal such that a predetermined bandwidth is output to the processor 80. The processor 80 analyzes the signal output by the SM 110 and is able to render an assessment of the condition of the commutator surface from the signal.

More particularly, worn or damaged commutator surfaces exhibit various characteristics. Pitch bar-marking on the commutator surface is a result from low or burned spots on the commutator surface that equals half or all the number of poles of the motor. Heavy slot bar-marking on the commutator surface is a result of etching of the trailing edge of the commutator bar in relation to the number of conductors per slot. Threading with fine lines on the commutator surface is a result of excessive metal transfer leading to resurfacing and excessive brush wear. Streaking of the commutator surface denotes the beginning of serious metal transfer to the carbon brush. Copper drag is an abnormal amount of excessive commutator material at the trailing edge of the commutator bar—although rare, flash over may occur if not corrected. Grooving is caused by an abrasive material in the brush or atmosphere.

Each of the commutator surface problems has a respective signal pattern which may be output by the SM 110. Accordingly, the processor 80 can determine what type of commutator problems exist based on the signal pattern output by the SM 110. Once the processor 80 determines the wear and/or damage condition of the commutator surface it can make troubleshooting recommendations as to the cause of the wear and/or damage condition. For example, the processor 80 can employ a lookup table stored in a memory (not shown) operatively coupled to the processor 80. A representative lookup table is shown in FIG. 15, which provides for narrowing down the possible causes for the wear/damage to the commutator surface. For instance, if the processor 80 determines from the filter output that grooving of the commutator surface has occurred, the processor 80 can inform the user that the likely cause of the condition is either contamination from abrasive dust or caused by an abrasive brush.

It should be appreciated that a single optical fiber 22 may be operatively coupled to both the signal monitor 110 and the interferometric system 40 in order to optimize optical fiber utilization.

FIGS. 13B–13D are illustrations representative of analog waveforms of the converted reflected measuring beam 56 with respect to various commutator surface conditions. FIG. 13B depicts an analog waveform of a reflected measuring beam $56_s$ for a commutator $30_s$, having a normal surface. In this embodiment, the commutator surface is comprised of many equidistantly spaced bars. As the measuring beam $56_s$ strikes a bar the reflected back measuring beam $56_s$ exhibits a higher amplitude than that reflected off a slot (i.e., space) between adjacent bars. Thus, the analog waveform of a measuring beam $56_s$ reflected off a normal commutator surface will look similar to a square wave wherein the portions of high amplitude represent the measuring beam $56_b$ being reflected off a conductive commutator bar and the portions of low amplitude represent the measuring beam $56_b$ being reflected off a space between two bars.

FIG. 13C illustrates a representative analog waveform of a reflected measuring beam $56_c$ of a commutator surface having leading edge wear of bars of the commutator $30_c$. Leading edge wear of the bars results in the reflected measuring beam $56_c$ having a correspondingly tapered sloped amplitude of the leading edge of the waveform. More particularly, since the amplitude of the reflected measuring beam $56_c$ is a function of the reflectance of the bar, the more abrasively worn portions of the bar will result in a reflected measuring beam $56_c$ having lower amplitude. Thus, as the reflected measuring beam $56_c$ moves initially from the space between two bars (where it has lowest amplitude) then along the worn leading edge of a bar toward the unworn or uniformly worn portion of the bar, the amplitude of the reflected measuring beam $56_c$ increases.

FIG. 13D illustrates a representative analog waveform of a reflected measuring beam $56_d$ of a commutator surface having surface contamination. The surface contamination results in the reflected measuring beam $56_d$ having sloped amplitude as well as lower amplitude as compared to the reflected measuring beam $56_b$ of FIG. 13B.

FIG. 13E illustrates a representative analog waveform of a reflected measuring beam $56_e$ of a commutator surface having scratches in the commutator surface. The scratches result in the reflected measuring beam $56_e$ having an irregular and lower amplitude as compared to the reflected measuring beam $56_b$ of FIG. 13B.

It should be appreciated that the analog waveforms illustrated in FIGS. 13B–13D are representative of only a few of many possible analog waveforms of the measuring beam 56 with respect to a variety of commutator surface conditions. Accordingly, the scope of present invention is intended to include the determination of surface conditions of an object that the article 22 is in contact with. The surface condition of the object may be determined by comparing the analog waveform of the measuring beam 56 reflected off the surface of the object and assessing the condition of the surface based on the reflected measuring beam 56. The assessment may be made by comparing the analog waveform against an expected waveform and/or by comparing the analog waveform against a table of waveforms stored in a memory, each of the stored waveforms being indicative of a particular surface condition. Any system, device, means or methodology for analyzing the reflected measuring beam 56 suitable for determining surface conditions may be employed to carry out the present invention and falls within the scope of the claims.

FIG. 14 is a schematic block diagram of another specific aspect of the present invention. This embodiment is similar to that of FIG. 13A but provides for the determination of the amount of wear, the rate of wear, and surface assessment in connection with multiple articles 20. As mentioned above, in motor applications more than one brush may be employed to provide current to the motor. The number of brushes used corresponds to the number of poles of the motor. In this embodiment, a plurality of interferometric systems 40 and analog signal monitors 110 similar to that of FIG. 20A are employed. According to this aspect of the present invention, the amount of wear, the rate of wear and commutator surface assessment in connection with N number of brushes 20 can be determined. Like reference numerals indicate like parts with respect to FIG. 13A and thus further description of these components is not presented for sake of brevity. Similar to the embodiment described in FIG. 12, the present embodiment maximizes the utilization of the laser 42. Furthermore, designs which share elements among multiple brushes to be monitored and analyzed may also be deployed here.

In addition, either of the embodiments of FIG. 13A or 14 may be employed to determine the speed of a motor. Time-based frequency measurements of the reflected light beam pulses off the commutator surface may be employed to provide indication of motor speed. Precise timing of the reflected pulse train can also be used to provide accurate values for acceleration within the period of 1 shaft revolution.

Figure 16:
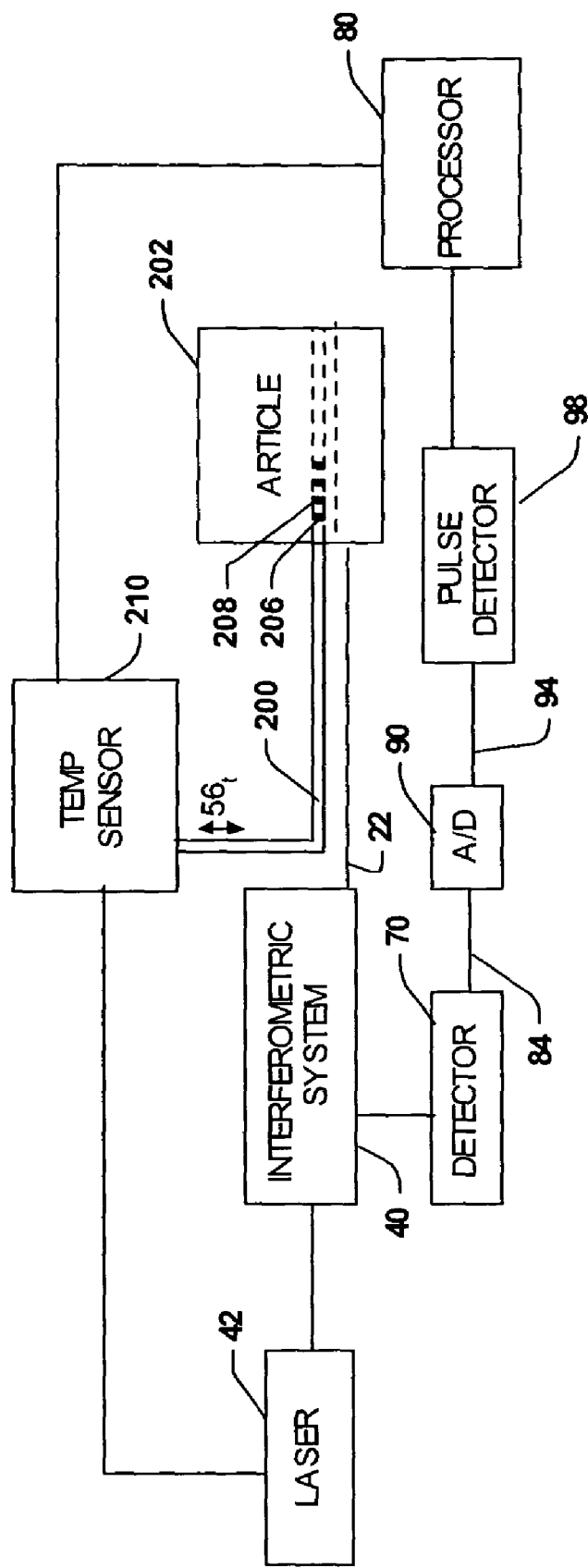
FIG. 16 is a schematic block diagram of another aspect of the present invention which employs a grated optical fiber to facilitate monitoring for changes in temperature in accordance with the present invention.

FIG. 16 is a schematic block diagram of another aspect of the present invention. In this embodiment, an optical fiber 200 with a doping material applied which may be employed to monitor for changes in temperature. This embodiment is similar to the embodiment depicted in FIGS. 11A and 13A, except that the optical fiber 200 is coated so as to have a temperature-sensitive index of refraction in conjunction with a coated surface area to provide for monitoring changes in temperature of article 202 and a temperature sensor 210 is operatively coupled to the optical fiber 200 so as to monitor the reflected measuring beam $56_t$ (similar to the manner discussed above with respect to the embodiment of FIG. 13A) for changes in temperature. Like parts between the embodiments of FIGS. 11A, 13A and 16 include like reference numerals. Further discussion as to parts already discussed is limited for sake of brevity.

The temperature sensor 210 is operatively coupled the optical fiber 200, laser 42 and the processor 80. The temperature sensor 210 provides for directing a measuring beam $56_t$ from the laser 42 to the optical fiber 200. The measuring beam $56_t$ travels through the optical fiber 200, at least a portion of which is embedded in an article such as brush 202. The measuring beam $56_t$ will strike an object that the article 202 is in contact with and be reflected back through the optical fiber 200. The temperature sensor 210 receives the reflected measuring beam $56_t$. The temperature sensor 210 converts the reflected measuring beam $56_t$ to an electrical signal and outputs it to the processor 80. The processor 80 analyzes the signal output by the temperature sensor 210 and is able to make a determination of temperature relating to the article 202.

Deformation or strain on the brush (and on the embedded fiber 200) may occur due to thermal expansion or other pressure related causes. It is to be appreciated that any grating suitable for carrying out the present invention may be employed such as a Fiber Bragg Grating. The optical fiber 200 will be grated such that a change in the index of refraction due to a temperature change will cause a shift in the peak transmission/reflection wavelength of the light being reflected off the grating surface. Temperature estimates of the article surrounding the wave-guide may be made by analyzing the attenuation of the reflected light signal at specific wavelengths. The present invention affords for a temperature sensing system/method that is light in weight, nonobtrusive, substantially insensitive to electromagnetic interference and capable of withstanding extreme conditions including wide temperature extremes, shocks and vibration.

To accomplish such a system/method, fiber gratings are constructed by doping the core of the optical fiber 200 with material such as germania. When exposed to light, the index of refraction of an optical core of silica based fiber with appropriate core dopants has been observed to have a modified index of refraction. By using phase masks or interfering laser beams as discussed above, it is possible to produce multiple variations in the index of refraction along the length of the fiber core producing an internal grating structure. Adjusting the spacing of the period during formation of the fiber grating changes its spectral transmission and reflection characteristics. When the optical fiber 200 is subject to longitudinal strain or compression along its length axis, the fiber gratings 206, 208 expand or contract causing a spectral shift that may be measured to determine longitudinal strain. By having two separated wavelengths for the fiber gratings 206, 208, respectively, $\lambda_1$ and $\lambda_2$, temperature changes as well as longitudinal changes of the optical fiber 200 may be measured. It should be appreciated that for measuring temperature of the article 202, an end of the optical fiber 20 may terminate within the article 202 rather than at a surface of the article 202.

Thus, by embedding the optical fiber 200 in an article such as a carbon brush 202, the amount of wear, the rate of wear and temperature fluctuations of the carbon brush 202 can be monitored. More specifically, the interferometric techniques discussed above with respect to measuring the amount of wear and the rate of wear of the carbon brush 20 may be combined with the grating system of FIG. 16 to result in a system which provides for monitoring several parameters relating to wear and temperature.

It will be appreciated that any suitable technique for grating the fiber optic cable 200 may be employed to carry out the present invention. U.S. Pat. No. 5,591,965 entitled Multiparameter Sensor System Using Multiple Grating Fiber Optic Birefringement Fiber teaches an exemplaray system of fiber optic grating, and this patent is incorporated herein by reference in its entirety.

Figure 17:
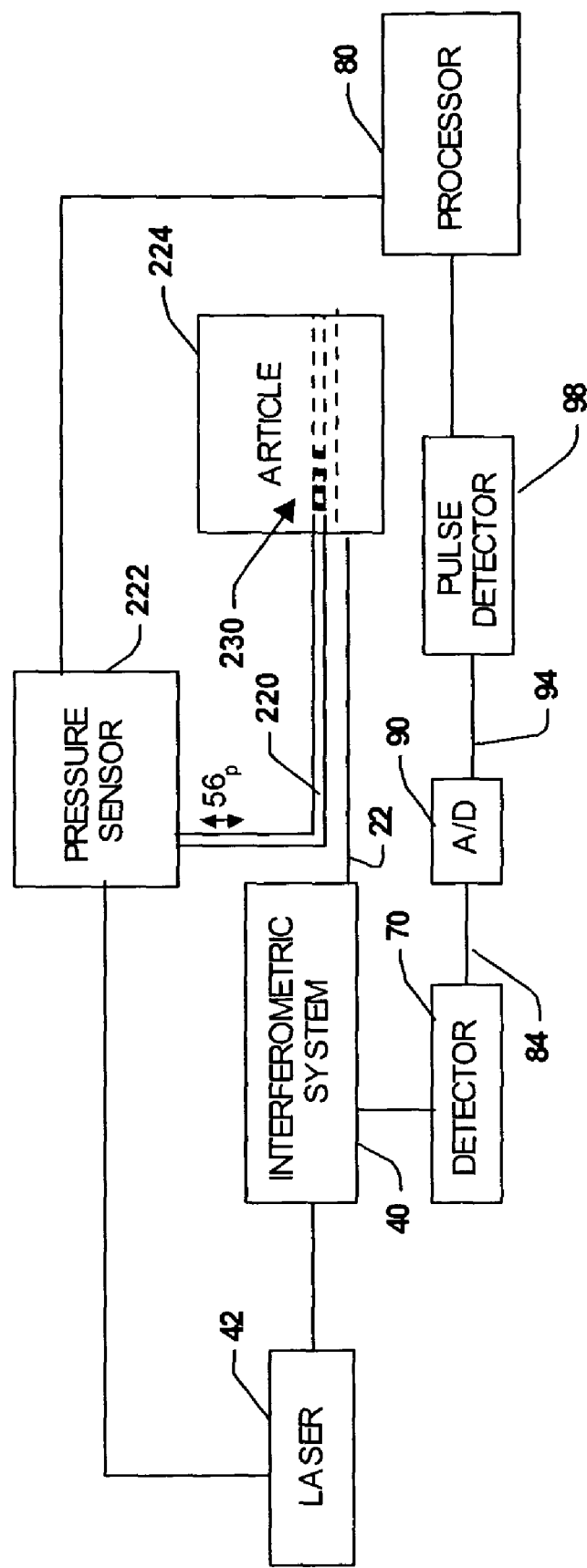
FIG. 17 is a schematic block diagram of another aspect of the present invention in which an optical fiber is employed to facilitate monitoring for changes in pressure in accordance with the present invention.

Turning now to FIG. 17, a schematic block diagram of another aspect of the present invention is shown. In this embodiment, an optical fiber 220 is employed which may be employed to monitor for changes in pressure. This embodiment is similar to the embodiment depicted in FIGS. 11a, 13a and 16 except that the optical fiber 220 includes microbends 230 to provide for monitoring changes in pressure relating to an article/environment 224. Like parts between the embodiments of FIGS. 11a, 13a and 16 include like reference numerals. Further discussion as to parts already discussed is limited for sake of brevity.

A pressure sensor 222 is operatively coupled to the optical fiber 220, laser 42 and the processor 80. The pressure sensor 222 provides for directing a measuring beam $56_p$ from the laser 42 to the optical fiber 220. The measuring beam $56_p$ travels through the optical fiber, at least a portion of which is embedded in an article such as brush 224. The measuring beam $56_p$ will strike an object that the article 224 is in contact with and be reflected back through the optical fiber 220. The pressure sensor 222 receives the reflected measuring beam $56_p$. The pressure sensor 222 converts the reflected measuring beam $56_p$ to an electrical signal and filters the signal such that a predetermined bandwidth is output to the processor 80. The processor 80 analyzes the signal output by the pressure sensor 222 and is able to make a determination of pressure relating to the article 224.

More particularly, the optical fiber 220 will undergo micro-bending as a result of pressure applied thereto. The affect of this bending is an attenuation of the measuring light beam $56_p$, which varies in relation to the amount of bending of the optical fiber 220. Accordingly, the optical fiber 220 can be employed to provide pressure data relating to the article/medium 224 it is exposed to. For instance, if the optical fiber 220 is embedded in an article such as a carbon brush, the optical fiber 220 can provide data relating to the pressure the carbon brush is exposed to. Similarly, if the optical fiber 220 is placed in an environment such as a pump chamber, the optical fiber can provide data relating to the pressure within the pump chamber. Additionally, by exposing the optical fiber 220 to the interior of a tire, pressure information relating to the inflation of the tire may be obtained.

A section of the optical fiber 220 contains a plurality of permanently induced microbends 230, that is, random or periodic undulations in the longitudinal axis of the optical fiber 220, which are typically small in amplitude relative to the diameter of the optical fiber 220. In a preferred embodiment, the microbends 230 are periodic and quasi-sinusoidal.

As the pressure surrounding the fiber cable 220 changes, the optical output correspondingly changes because the pressure change affects the amplitude of the induced microbends 230 which in turn affects the optical transmissivity of the optical fiber 220. The increase or decrease in the output of the optical fiber 220 may be employed to monitor pressure changes the optical fiber 220 is exposed to. Any suitable technique for inducing microbends may be employed to carry out the present invention. It should be appreciated that for measuring pressure of the article 224, an end of the optical fiber 220 may terminate within the article 224 rather than at a surface of the article 224.

By combining various embodiments discussed above with respect to measuring the amount of wear and the rate of wear of the carbon brush 20 with the pressure sensing embodiment of FIG. 17, a system results which provides for monitoring several parameters relating to wear and pressure of an article the fiber optic cable 220 is embedded in.

It is to be appreciated that the grating technique discussed above with respect to FIG. 16 and the microbending technique of FIG. 17 may be combined together with other aforementioned embodiments of the present invention to provide a multi-parameter sensing system which provides for the monitoring of article wear, rate of wear, article temperature and article pressure.

Figure 18:
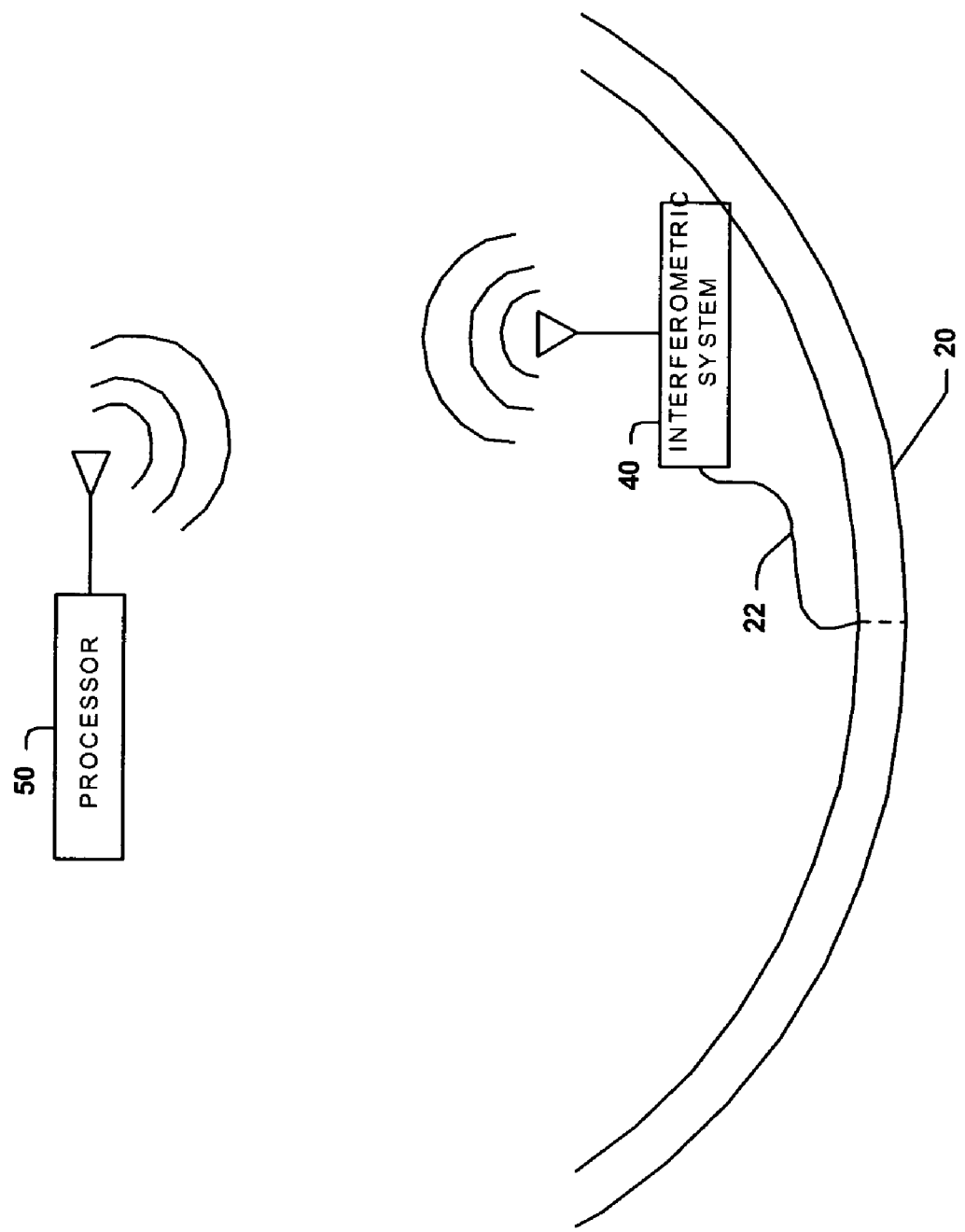
FIG. 18 is a schematic diagram illustrating the present invention as employed in a tire.

FIG. 18 is a schematic diagram illustrating the present invention as employed in a tire 20. As mentioned above, the present invention may be employed to analyze wear, rate of wear, and/or temperature and/or pressure information relating to the tire 20. Information obtained by the interferometric system may be transmitted wirelessly to the processor 50. It will be appreciated that a temperature sensor or pressure sensor may be employed in place of or in addition to the interferometric system 40. In the case of wireless operation, power may be scavaged from the environment or generated locally to power the system using known techniques (e.g., inductive power generation).

Figure 19:
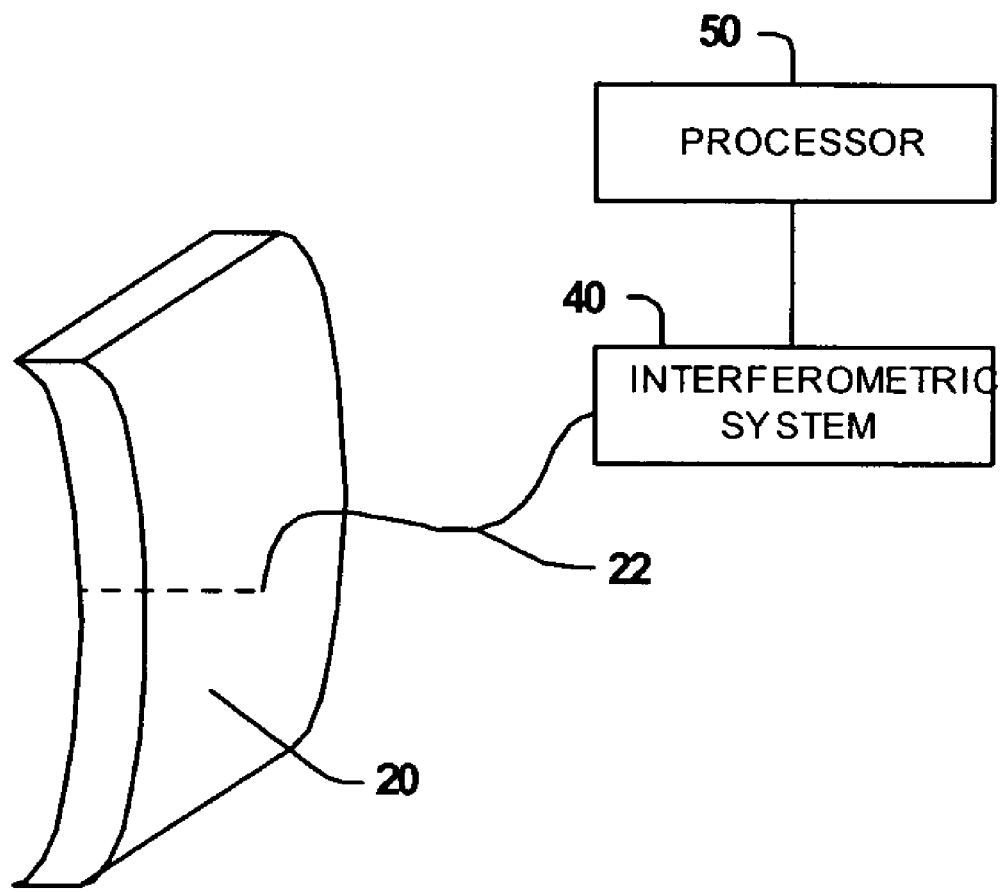
FIG. 19 is a schematic diagram illustrating the present invention as employed in a brake pad.

FIG. 19 is a schematic diagram illustrating the present invention as employed in a brake pad 20. As mentioned above, the present invention may be employed to analyze wear, rate of wear, and/or temperature and/or pressure and surface information relating to the brake pad 20. It will be appreciated that a temperature sensor or pressure sensor may be employed in place of or in addition to the interferometric system 40.

Figure 20:
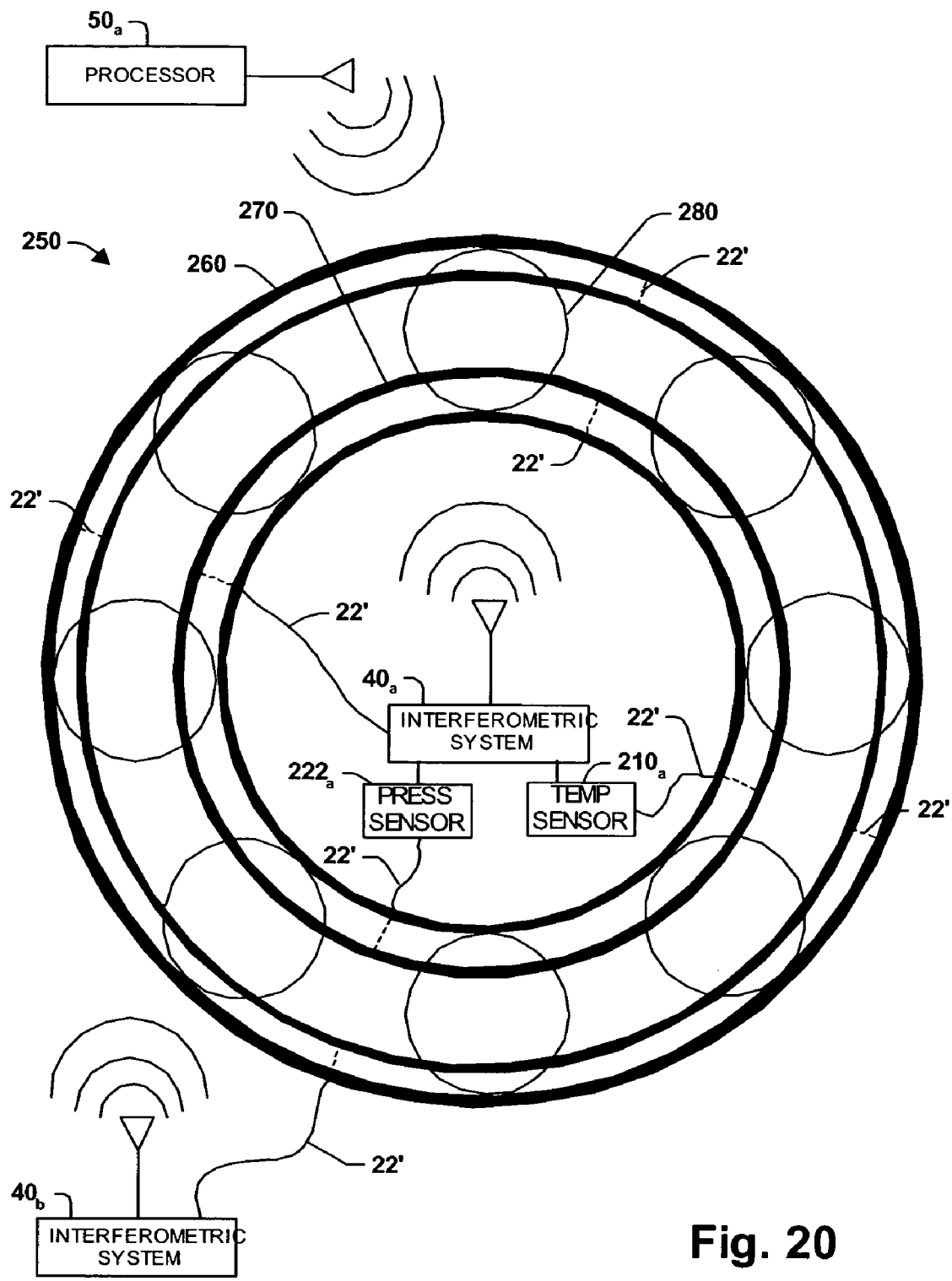
FIG. 20 is a schematic diagram illustrating the present invention as employed in a bearing.

It is further to be appreciated that the present invention can be employed to analyze wear, rate of wear, and/or temperature and/or pressure information as it relates to motors. Typically, a shaft (not shown) is coupled to the rest of a motor by a pair of bearings. FIG. 20 illustrates a ball bearing 250 making up one of a pair of ball bearings employed in a motor. It will be appreciated that other sorts of bearings (e.g., roller bearings, sleeve bearings, hydrodynamic bearings, etc.) may alternatively be used to couple the shaft to the rest of the motor. It will further be appreciated that more than two bearings may be employed to rotatably couple the shaft to the rest of the motor. Although, the present invention is described with respect to ball bearings other bearings such as sleeve bearings, hydrodynamic bearings, double row ball bearings and thrust bearings may be measured according to the present invention. For example, in the case of hydrodynamic bearings, the wear sensor can be used to determine the wear and rate of wear of the babbitt. The processor may then determine (forecast) when the bearing needs to be re-babbitted. Additionally, the sensor can be employed to determine the state of any lubrication, for example, the lack of lubrication or the color of the lubrication (e.g., opaque) to provide health status of the bearing or lubrication.

The bearing 250 has an outer race 260, an inner race 270, and a set of balls 280 therebetween. A number of optical fibers 22' are shown embedded in the outer race 260 and the inner race 270, such that one end of the fibers 22' are exposed to the balls 280. The other end of the optical fiber 22' is shown operatively coupled to an interferometric system $40_a$ a for the inner race 270 and $40_b$ for the outer race 260. The interferometric system $40_a$ a and $40_a$ b are operatively coupled to a processor $50_a$. It is to be appreciated that the interferometric system $40_a$ and $40_b$ can be integrated and even attached to the end of the inner race 270 and the outer race 260, respectively, away from the set of balls 280. Furthermore, the interferometric systems $40_a$ and $40_b$ may include a wireless transceiver for wirelessly transmitting data to the processor $50_a$. Power may be scavaged from the environment or generated locally using known techniques such as inductive power generation.

It is to be appreciated that interferometric system $40_a$ and $40_b$ may be coupled to processor $50_a$ using direct wire links or even network links. Processor $50_a$ may also be integrated with the interferometric systems and located at the article (e.g., bearing) or located remotely using only a fiber link to the article to provide a smart bearing. A similar scheme may exist for sharing system elements when multiple sensors are deployed. Although, a single interferometric system is shown coupled directly to a single optical fiber 22' for both the outer race 260 and the inner race 270, each optical fiber 22' in the outer race 260 can be coupled to the interferometric system $40_b$ and each optical fiber in the inner race 270 can be coupled to the interferometric system $40_a$. Furthermore, each optical fiber 22' can include a dedicated respective interferometric system.

At least one of the optical fibers 22' could include a grating employed to sense changes in temperature, similar to that described in FIG. 16. This optical fiber 22' can be coupled to a temperature sensor $211_a$ for transmitting temperature data to the processor $50_a$ via the interferometric system $40_a$. Additionally, at least one of the optical fibers 22' can include microbends employed for monitoring changes in pressure, similar to that described in FIG. 17. This optical fiber 22' can be coupled to a pressure sensor $222_a$ for transmitting pressure data to the processor $50_a$ via the interferometric system $40_a$. Optical fibers may also be employed to measure radial and axial wear on the bearing raceways. All of these parameters can be combined using sensor fusion to establish device health or state, fault mode, and control actions based on warnings or recommendations.

Figure 21A:
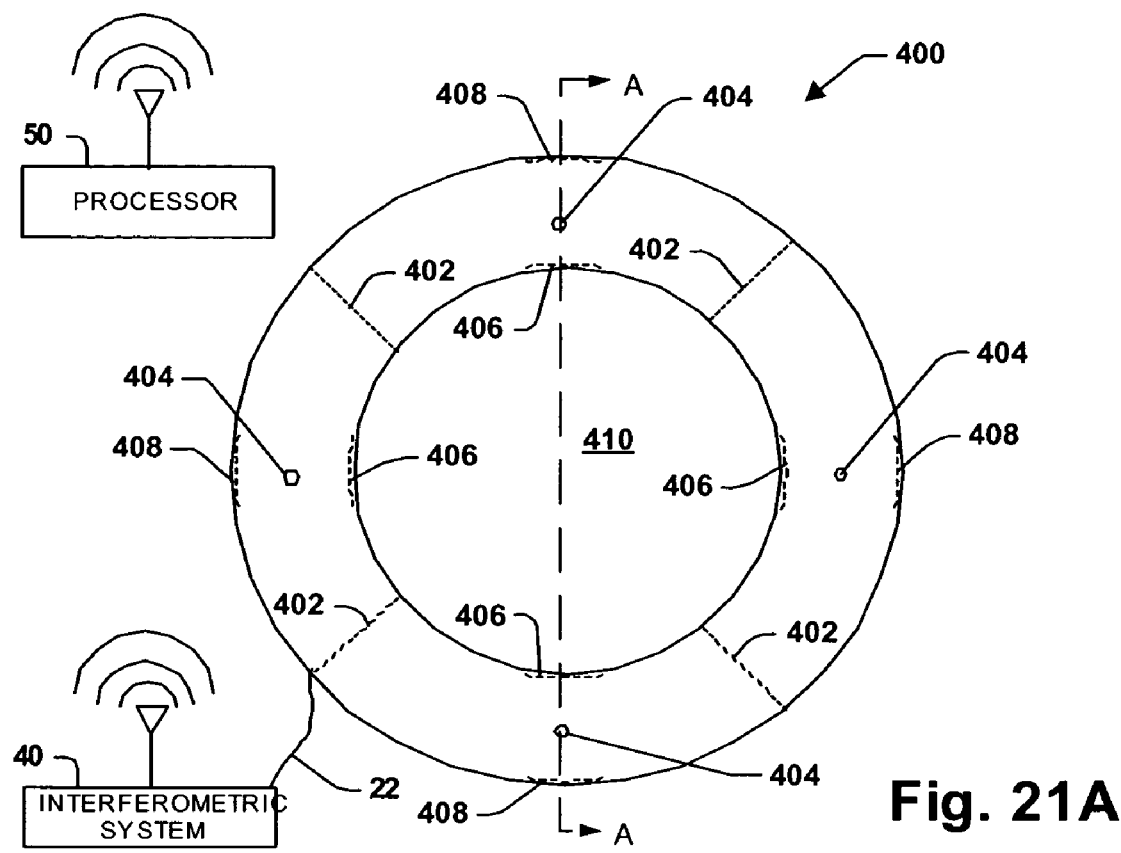
FIG. 21A is a partial schematic diagram illustrating the present invention as employed in a seal.
Figure 21B:
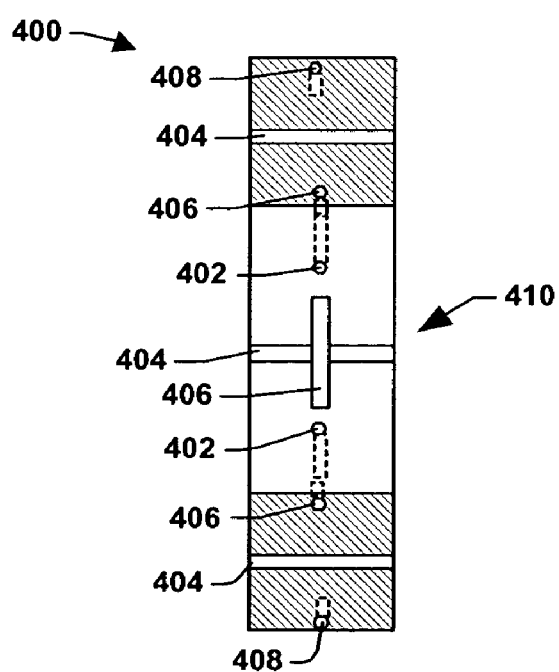
FIG. 21B is cross-sectional view of the seal of FIG. 16A along the lines A—A.

In another aspect of the invention, an optical fiber is embedded in a seal, such as that used in a pump, and a light source is introduced into the fiber. FIGS. 21A–21B illustrate a seal 400 including a plurality of optical fibers embedded therein. The seal 400 is an annular seal, such as that found surrounding a shaft of a pump or the like. However, any size or shaped seal could include an optical fiber embedded therein. For example, an optical fiber can be embedded within a lip or undulation portion of a seal. Furthermore, different optical fibers can be oriented differently to measure different areas of wear or for measuring different conditions of the seal. The fiber type, fiber orientation, fixturing, and doping of the optical fiber will determine the parameters which may be measured. For example, a fiber embedded radially into the seal will have one end extending through the outer diameter of the seal and the other end extending to the inner diameter to the wear surface of the seal. Since the fiber tip will wear along with the contact surface of the seal against the rotating shaft, the seal wear can be measured in real time and with a high degree of accuracy using interferometric techniques or the like.

The seal 400 includes a central opening 410 adapted to receive a shaft (not shown). The plurality of optical fibers include radial fibers 402, axial fibers 404, inner circumferential fibers 406 and outer circumferential fibers 408. The optical fibers can be utilized in providing information regarding various conditions with respect to the operation and health of the seal. A bragg grating and selected doping materials may be formed in the embedded optical fiber to measure conditions such as seal temperature, seal compression, thermal expansion and deformation of the seal. Additionally, the optical fibers can be employed in measuring characteristics in lubricating film, such as thickness and variation over time, fluid advancement rate, geometry, contaminants and potential cavitation. A series of parallel optical fibers may also monitor the advancing edge of the fluid film as the seal wears. A group of fibers may also image the rotating metal shaft through the lubricating film to detect signs of shaft wear. The interferometric system may also determine the radial displacement (i.e. run out) of the shaft to a high degree of accuracy. This provides other useful diagnostic information such as worn bearings or bent shafts.

The other end of the optical fiber 402 is shown operatively coupled to an interferometric system 40. The interferometric system 40 is operatively coupled to a processor 50. It is to be appreciated that the interferometric system 40 and the processor 50 can be integrated and even attached to the end of the seal 400. Furthermore, the interferometric systems 40 may include a wireless transceiver for wirelessly transmitting data to the processor 50. In one aspect of the invention, the interferometric system 40 and the processor 50 can be integrated into the seal to provide a smart seal. The smart seal can provide a health diagnostics signal via a wire or a wireless transmission. For wireless operation power may be generated locally from the moving structure using known power generation techniques (e.g., inductive power generation). Although, a single interferometric system is shown coupled directly to a single optical fiber 402, each optical fiber 402, 404, 406 and 408 can be coupled to the interferometric system 40. Furthermore, each of the optical fibers 402, 404, 406 and 408 can include a dedicated respective interferometric system.

At least one of the optical fibers 402, 404, 406 and 408 could include a grating employed to sense changes in temperature, similar to that described in FIG. 16. This optical fiber can be coupled to a temperature sensor for transmitting temperature data to the processor 50 via the interferometric system 40. Additionally, at least one of the optical fibers can include microbends employed for monitoring changes in pressure, similar to that described in FIG. 17. This optical fiber can be coupled to a pressure sensor for transmitting pressure data to the processor 50 via the interferometric system 40. All of these parameters can be combined using sensor fusion to establish device health or state, fault mode, and control actions based on warnings or recommendations.

Information regarding the seal performance such as indicated above provides the necessary state information to enable close loop control over the radial force applied to the seal. This can enable the seal to be effective even at very low speeds and measure operating conditions such as viscosity, temperature, and wear change. A very low cost, limited range actuator such as a piezo-based device may provide the real-time control of seal pressure. The piezo-based device can be embedded throughout the seal or in specific contact areas to control the pressure against the surface that the seal is engaging.

Operating the seal at or near optimal conditions holds the promise of significantly extending the life of seals by minimizing seal wear over a wide range of operating conditions and also allowing the seal to be effective even after substantial wear has occurred. Finally, the safety of systems which require a high degree of seal integrity can be enhanced since notification may be provided before actual seal failure and leakage has occurred. Notification can be provided if seal wear is occurring at an abnormal or accelerated rate due to seal defects or process problems. Additionally, heuristic, stochastic, and analytical models of seals can be employed to establish the remaining useful life of a seal and predict when the seal will fail. This provides the critical information needed for condition-based maintenance (proactive) on one of the most critical and failure-prone components in industrial systems. Since closed-loop compensating/optimizing control may also be employed, the seal system may continue to operate at a suboptimal level with perhaps less efficiency or even accelerated wear, while for example avoiding leakage of caustic or explosive fluids and controlling the time to failure of the seal and avoiding an unscheduled shutdown or catastrophic failure.

Figure 22A:
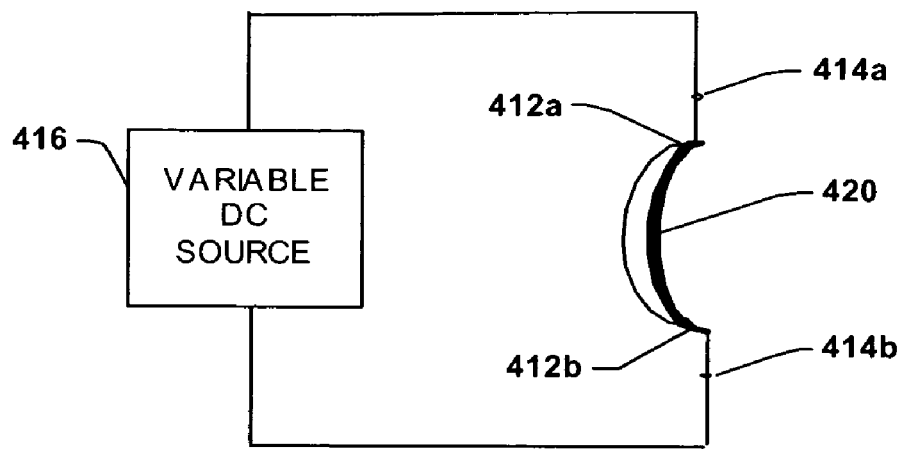
FIG. 22A is schematic diagram of a piezoelectric device coupled to an adjustable power source in accordance with one aspect of the invention.

FIG. 22A illustrates the operation of a piezoelectric device 420 in accordance with the present invention. The piezoelectric device 420 can be embedded in a seal for controlling the flexing of the seal and thus the seal pressure with respect to a contact surface. The piezoelectric device 420 is mounted in the form of a radially defined arc at non-movable fixed locations 412a and 412b. Affixed to the piezoelectric material 420 are electrodes 414a and 414b which are connected to a variable power source 416 (e.g., DC power). When voltage is applied by the variable power source 416 to the piezoelectric device 420, the radially defined arc of the piezoelectric material 420 is caused to expand and/or contract in a radially defined direction as depicted by the dotted line in FIG. 22A. The variable power source 416 allows for voltage applied to the piezoelectric device 420 to be varied resulting in the adjustment of the angle of the piezoelectric device 420. This allows for expansion and/or contraction of the seal and adjustment of the seal pressure against a seal contacting surface.

Figure 22B:
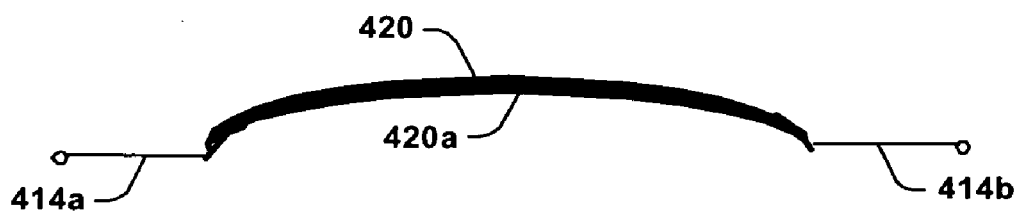
FIG. 22B is a top view of a piezoelectric device in accordance with one aspect of the invention.
Figure 22C:
FIG. 22C is a top view of an alternate piezoelectric device in accordance with one aspect of the invention.
Figure 22D:
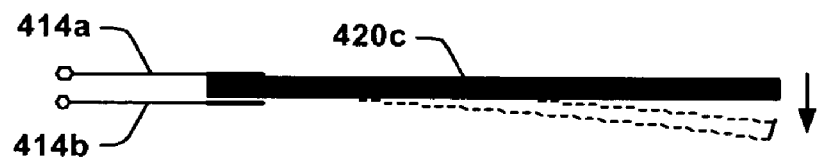
FIG. 22D is a top view of yet another alternate piezoelectric device in accordance with one aspect of the invention.

Now referring to FIG. 22B, a detailed drawing of the radially-arced piezoelectric device 420 is illustrated. As shown, electrodes 414a and 414b are attached to a first and second end of a single layer of piezoelectric device 420. When voltage is applied to the ends of the material as shown in FIG. 22A, the curvature of the formed arc changes because of an elongation in the crystalline structure of the piezoelectric device 420. Turning now to FIG. 22C, another example of a piezoelectric device is illustrated. In this example, the piezoelectric device 420b is formed as a straightened single layer with electrodes 414a and 414b attached at opposing ends as shown in FIG. 22B. As voltage 416 is applied, the piezoelectric device lengthens and contracts in a straight line causing the piezoelectric device to radially deflect inward or outward. A piezoelectric device 420c is shown in FIG. 22D, with electrodes 414a and 414b at the same end of the material. When a voltage is applied to the piezoelectric material 420C, a bend may occur in the direction of the arrow toward the dotted line as shown, for example. Bends may occur in the opposite direction if an opposite polarity voltage is applied.

Figure 23A:
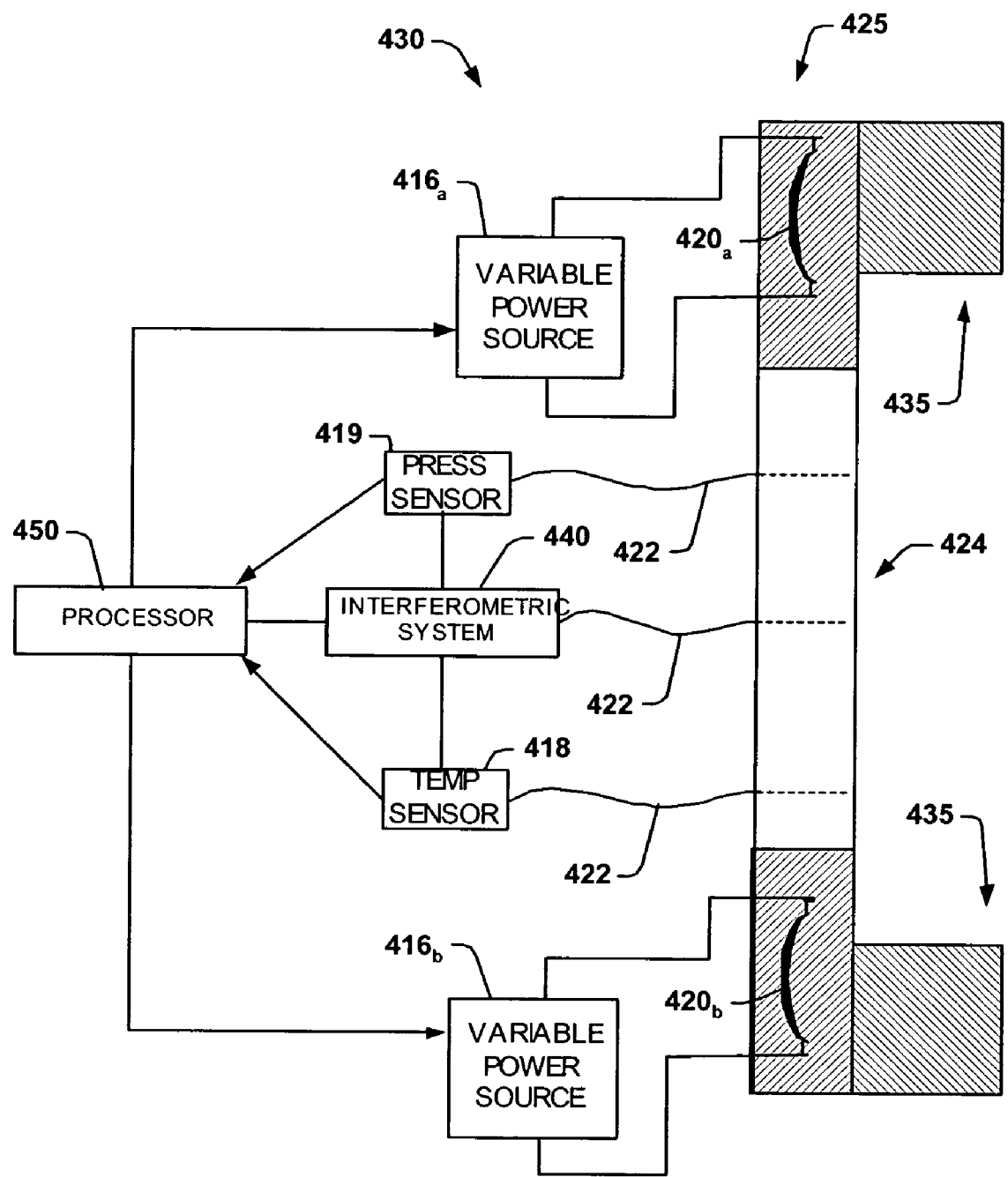
FIG. 23A is a partial schematic diagram illustrating a control system according to the present invention for controlling seal pressure.

Turning now to FIG. 23A, a partial schematic block diagram of a control system 430 is provided. A seal 425 is provided adjacent a contacting surface 435. The seal 425 includes an opening 424 for receiving a shaft of a pump (not shown) or for allowing liquid to flow through the opening 424. A first piezoelectric device $420_a$ is disposed in a first end of the seal 425 contacting a first surface of the contacting surface 435, and a second piezoelectric device $420_b$ is disposed in a second end of the seal 425 contacting a second surface of the contacting surface 435. The first piezoelectric device $420_a$ is coupled to a first variable power source $416_a$ and the second piezoelectric device $420_b$ is coupled to a second variable power source $416_b$. Varying the voltages of the power sources causes flexing of the piezoelectric devices flexing the seal (e.g., expanding or contracting) and thus changing the pressure of the seal ends against the contacting surface 435.

A plurality of optical fibers 422 are embedded within the seal 425 for measuring seal wear, seal environment pressure and temperature environment pressure. An optical fiber 422 is coupled to a pressure sensor 419, which is coupled to an interferometric system 440 and a processor 450 for measuring pressure. An optical fiber 422 is coupled to a temperature sensor 418, which is coupled to the interferometric system 440 and the processor 450 for measuring temperature. An optical fiber 422 is directly coupled to the interferometric system 440 and the processor 450 for measuring seal wear. The processor 450 can utilize any or all of these measurements to adjust the voltage of the variable voltage sources, $416_a$ and $416_b$, and thus the seal pressure based on real time measurements. An opportunity also exists for dynamic real-time control of the seal interface to accommodate circular asymmetry of the shaft and radial shaft misplacement due to for example unbalance and bearing wear.

Figure 23B:
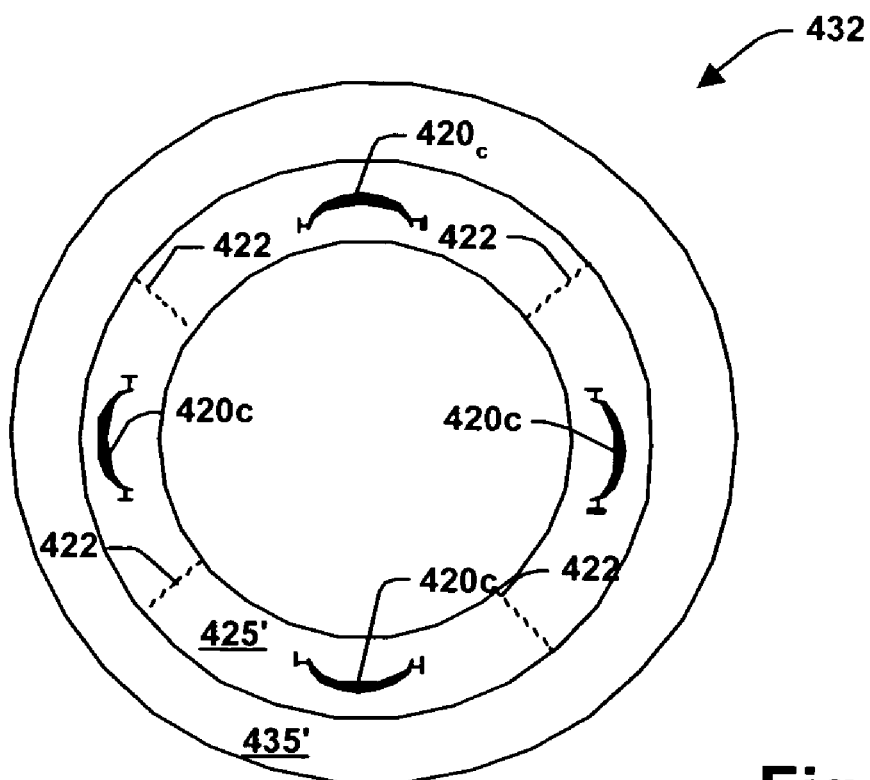
FIG. 23B is a front view of an alternate control system with a seal exposed within a contacting surface according to the present invention.
Figure 23C:
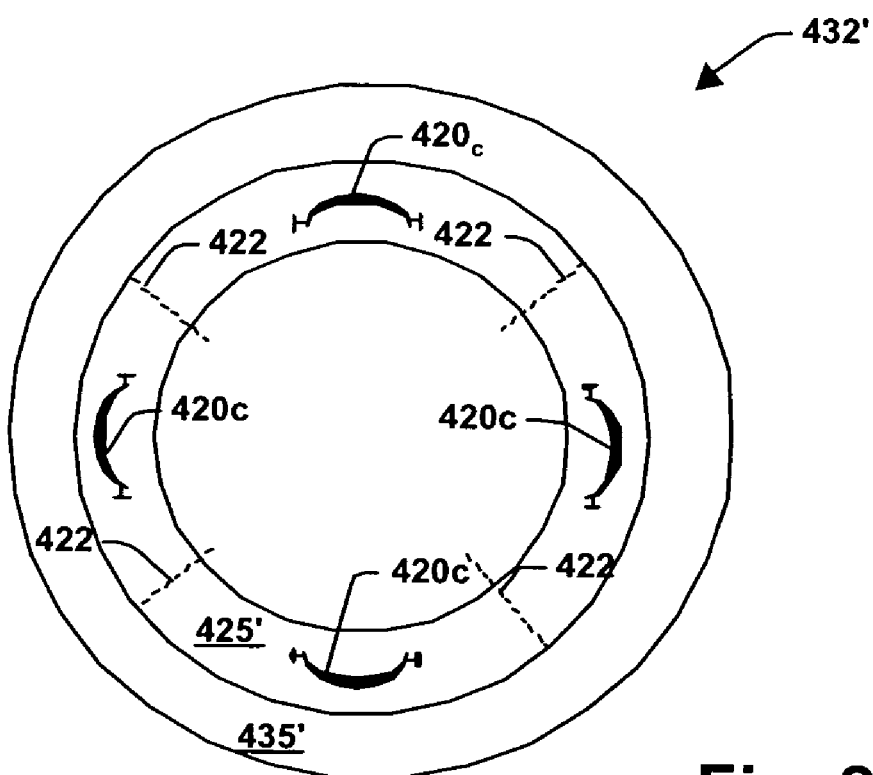
FIG. 23C is a front view of the seal of FIG. 18B with the optical fibers extending outside the seal according to the present invention.

FIG. 23B illustrates a system 432 wherein a seal 425' is disposed radially inboard a contacting surface 435'. A plurality of piezoelectric devices $420_c$ are disposed circumferentially around the seal 425'. A plurality of optical fibers 422 are disposed radially within the seal 425'. The plurality of piezoelectric devices $420_c$ allow for applying axially movable pressure on a shaft (not shown) to increase the contact pressure of the seal on the shaft. Alternatively, the plurality of piezoelectric devices 420, allow for applying pressure on the contacting surface 435'. FIG. 23c illustrates an alternate example of a system 432' having a seal similar to the seal 425', except that the plurality of optical fibers 422 extend outside of the seal 425'.

Figure 24:
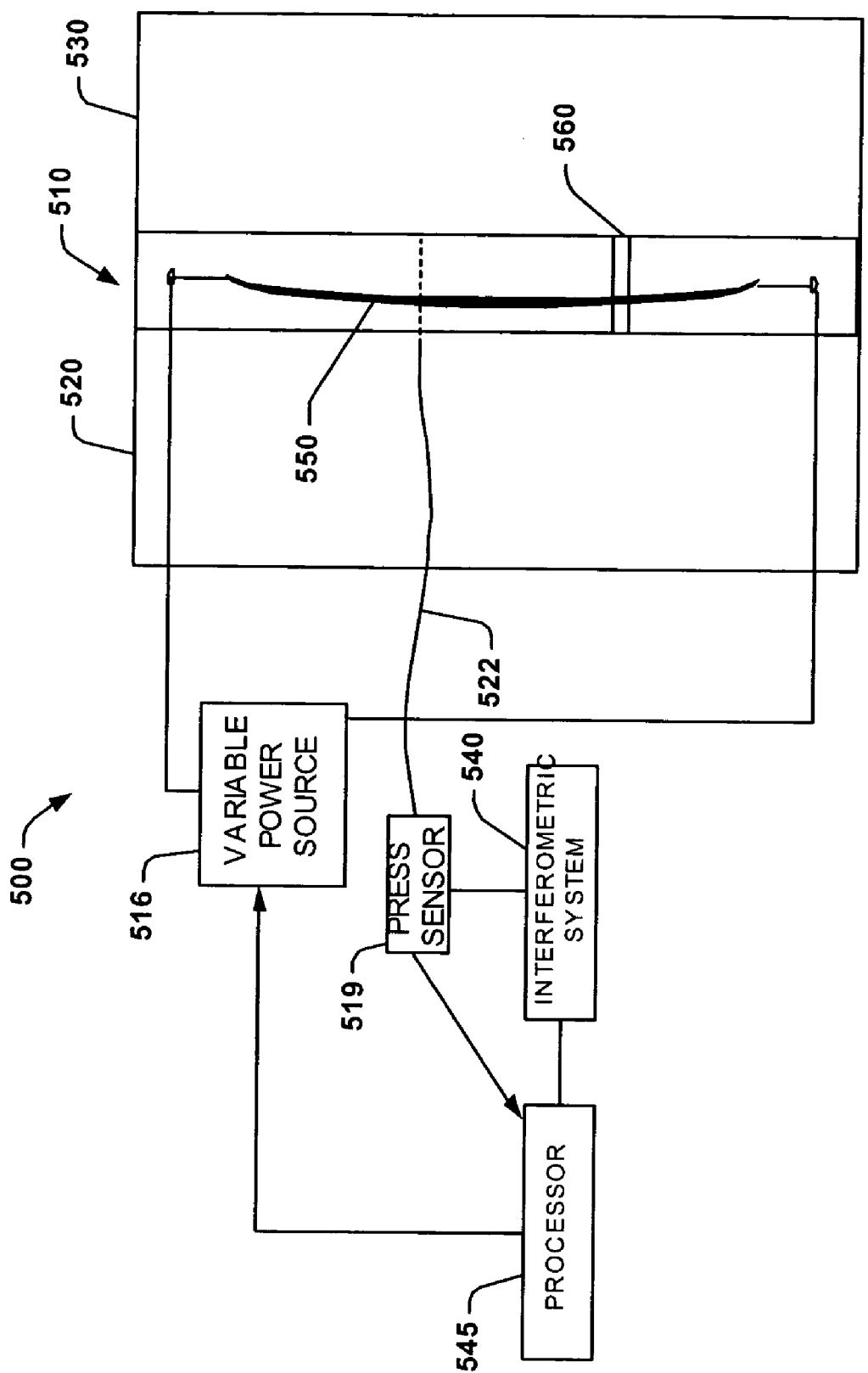
FIG. 24 is a partial schematic diagram illustrating an alternate control system according to the present invention for controlling fluid pressure.

FIG. 24 illustrates a partial schematic block diagram of an alternate seal control system 500. A seal 510 is provided between a first chamber 520 and a second chamber 530. A piezoelectric device 550 is embedded along a substantial portion of the seal 510. The seal 510 forms a diaphragm between the first chamber 520 and the second chamber 530. An aperture 560 is disposed in the seal 510 for allowing fluid flow between the first chamber 520 and the second chamber 530. The piezoelectric device 550 is coupled to a power source 516. Varying the voltages of the power source 516 causes flexing of the piezoelectric device and the seal 510 and thus changes the volume of fluid and the fluid pressure within the first chamber 520 and the second chamber 530. An optical fiber 522 is coupled to a pressure sensor 519, which is coupled to an interferometric system 540 and a processor 545 for measuring fluid pressure. The processor 545 can utilize the pressure measurements to adjust the voltage of the variable voltage source 516 and thus flex the piezoelectric device 550 causing the seal 510 to flex which adjusts the fluid pressure in the first chamber 520 and the second chamber 530.

What has been described above are one or more aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" is used in either the detailed description and the claims, such term is intended to be inclusive in a manner similar to the term "comprising."

What is claimed is:

1. A system for determining at least one condition of a semiconductor substrate or a process associated with the substrate, comprising:
   at least one optical waveguide at least part of which is embedded in the semiconductor substrate, the at least one optical waveguide having first and second ends, the first end receiving a beam of light from a light source, the second end extending to a location near a surface of the semiconductor substrate and wearing substantially commensurate with wearing of the surface; and
   an interference measuring system operatively coupled to the optical waveguide to receive light from the waveguide that varies as a function of the at least one condition.

2. The system of claim 1, the optical waveguide formed, at least partially, of a doped variation in the substrate.

3. The system of claim 1, the measuring system including an interferometric system configured to ascertain an indication of the at least one condition based on the light received from the waveguide.

4. The system of claim 3, the indication of the at least one condition relating to at least one of a thickness of material deposited onto the surface, a uniformity of material deposited onto the surface, an amount of material removed from the surface during etching or stripping, an amount of material removed during chemical mechanical polishing, a rate of wear of the surface or a material layered onto the surface, information regarding pressure, information regarding temperature, information regarding adjacent surface reflectance, and information regarding contaminants.

5. The system of claim 3, the waveguide having a wear characteristics substantially equal to that of the surface.

6. The system of claim 3, the measuring system further including a processor.

7. The system of claim 3, further comprising a plurality of waveguides arranged throughout the substrate, the interferometric system configured to ascertain respective indications of the at least one condition based on the light received from the waveguides.

8. The system of claim 6, the processor utilizing the indication to control at least one operating parameter of a fabrication process associated with the substrate.

9. The system of claim 6, the substrate comprising a MEMS device and the processor utilizing the indication to control at least one operating parameter during normal usage of the MEMS device.

10. The system of claim 7, the at least one condition relating to uniformity of material deposited onto the surface.

11. The system of claim 8, the at least one operating parameter relating to at least one of a drive system, a gas distribution system, a slurry distribution system, an etching system, a temperature system and a pressure system.

12. The system of claim 9, the processor controlling at least one parameter to extend the life of the MEMS device.

13. A semiconductor substrate having an optical waveguide at least partially embedded therein such that a first end of the waveguide extends to a location near a surface of the semiconductor substrate and wears substantially commensurate with wearing of the surface and a second end of the waveguide receives light from a light source and provides light to an interferometric system configured to ascertain an indication of at least one condition of the semiconductor substrate or a process associated with the semiconductor substrate based on the light received from the waveguide, the light received from the waveguide varying as a function of the at least one condition.

14. A system for monitoring a MEMS device comprising:
   an optical waveguide at least partially embedded in the MEMS device such that a first end of the waveguide extends to a location near a surface of the device and wears substantially commensurate with wearing of the surface and a second end of the waveguide receives light from a light source; and
   an interferometric system operatively coupled to the waveguide and configured to ascertain an indication of at least one condition of the EMS device or a process associated with the MEMS device based on transmissions of light received from the waveguide which vary as a function of the at least one condition.

15. The system of claim 14, the indication being provided to a processor that selectively controls one or more operating parameters of the process associated with the MEMS device.

16. A system for controlling a process being performed on a semiconductor substrate comprising:
   means, at least a part of which is integral with the semiconductor substrate, for optically measuring the wearing of an optical waveguide that correlates to at least one condition of the semiconductor substrate or an operating condition relating to the process being performed on the semiconductor substrate, the means for optically measuring including an interferometric system; and
   means for controlling at least one operating parameter of the process in response to an indication of the at least one measured operating condition provided by the means for optically measuring the wearing of the optical waveguide.

17. The system of claim 16, the at least one operating condition relating to at least one of a thickness of material being deposited onto the surface, a uniformity of material being deposited onto the surface, an amount of material being removed from the surface during an etching or stripping step, an amount of material being removed during a chemical mechanical polish step, a rate of wear of the surface or a material layered on the surface, information regarding pressure, information regarding temperature, information regarding adjacent surface reflectance, and information regarding contaminants.

18. The system of claim 17, the at least one operating parameter relating to at least one of a drive system, a gas distribution system, a slurry distribution system, an etching system, a temperature system and a pressure system.

19. The system of claim 16, the process comprising normal operation of a MEMS device.

20. The system of claim 16, the process comprising fabrication of a semiconductor or MEMS device.

21. The system of claim 17 wherein thickness is measured through surface light loss.

22. The system of claim 17 wherein rate of wear is measured through wearing of the optical waveguide which is substantially as hard or less hard than the surface so as to wear as the surface wears.

23. A substrate to facilitate monitoring at least one condition associated with the substrate comprising:
a semiconductor substrate material having opposed first and second surfaces and at least one waveguide, at least a part of the at least one waveguide including a first end configured to receive light from a light source and return light for measurement of interference and a second end extending through the first surface to a location near the second surface and wears substantially commensurate with wearing of the second surface, such that at least part of the at least one waveguide is embedded in the semiconductor substrate material.

24. A method for controlling a process associated with a substrate comprising:
optically measuring at least one operating condition regarding the semiconductor substrate or the process with an interferometric system by employing an optical waveguide that is at least partially integrated into the semiconductor substrate such that a first end of the waveguide extends to a location near a surface of the substrate and wears substantially commensurate with wearing of surface and a second end of the waveguide receives light from a light source; and
controlling at least one operating parameter of the process in response to the at least one measured operating condition.

25. The method of claim 24, the at least one operating condition relating to at least one of a thickness of material deposited onto the surface, a uniformity of material deposited onto the surface, an amount of material removed from the surface during etching or stripping, an amount of material removed during chemical mechanical polishing, a rate of wear of the surface or a material layered onto the surface, information regarding pressure, information regarding temperature, information regarding adjacent surface reflectance, and information regarding contaminants.

26. The method of claim 24, the at least one operating parameter relating to at least one of a drive system, a gas distribution system, a slurry distribution system, an etching system, a temperature system and a pressure system.

27. A method of monitoring at least one condition of a process associated with a semiconductor substrate comprising:
providing light to a waveguide at least partially formed within the semiconductor substrate;
monitoring variations in the light by interference in the waveguide;
ascertaining the wear of the waveguide as an indication of the at least one condition based on the monitored variations.

28. The method of claim 27 further comprising:
forming the waveguide in the substrate such that a first end of the waveguide is located near a surface of the substrate and a second end of the waveguide receives light provided by a light source and allows for monitoring light variations in the waveguide.

* * * * *